United States Patent
Chen et al.

(10) Patent No.: US 10,447,160 B2
(45) Date of Patent: Oct. 15, 2019

(54) PULSE WIDTH CONTROL FOR SWITCHING MODE POWER CONVERTERS

(71) Applicant: SEMICONDUCTOR COMPONENTS INDUSTRIES, LLC, Phoenix, AZ (US)

(72) Inventors: Gang Chen, Taipo (HK); Gabor Reizik, Dublin, CA (US); Christopher Bartholomeusz, Draper, UT (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/941,528

(22) Filed: Mar. 30, 2018

(65) Prior Publication Data

US 2018/0337599 A1 Nov. 22, 2018

Related U.S. Application Data

(60) Provisional application No. 62/506,679, filed on May 16, 2017.

(51) Int. Cl.
*H02M 3/156* (2006.01)
*H02M 3/158* (2006.01)
*H02M 1/00* (2006.01)

(52) U.S. Cl.
CPC ............ *H02M 3/158* (2013.01); *H02M 3/156* (2013.01); *H02M 3/1584* (2013.01);
(Continued)

(58) Field of Classification Search
CPC ............... H02M 3/156; H02M 3/1563; H02M 2001/0025; H02M 2001/0009; H02M 2003/1566; H02M 3/158
(Continued)

(56) References Cited

U.S. PATENT DOCUMENTS 7,619,395 B2 * 11/2009 Mok ..................... H02M 3/156
 323/224
9,081,403 B1 * 7/2015 Leone ..................... G05F 1/468
(Continued)

OTHER PUBLICATIONS

Gang Chen et al., "Multi-Phase Control for Pulse Width Modulation Power Converters," U.S. Appl. No. 15/398,912, filed Jan. 5, 2017.
(Continued)

*Primary Examiner* — Alex Torres-Rivera
(74) *Attorney, Agent, or Firm* — AMPACC Law Group, PLLC

(57) ABSTRACT

A circuit generates an output voltage from an input voltage and includes a Pulse Width Modulation (PWM) controller. The PWM controller initiates a PWM pulse according to a first comparison that uses a Current Sense and Ramp (CSR) signal and an error signal. The PWM controller ends the PWM pulse according to a second comparison that uses the CSR signal and a threshold signal. The CSR signal is generated using a current sense signal and a ramp signal according to the input voltage. The error signal is generated from the output voltage and a reference voltage. In an embodiment, the circuit is one of a plurality of substantially identical modules, wherein one module is a master module. The master module generates an error signal used by each module. A clock input of each module is respectively connected to a clock output of another module to sequentially activate each of the modules.

18 Claims, 14 Drawing Sheets

(52) U.S. Cl.
CPC .............. *H02M 2001/0009* (2013.01); *H02M 2001/0025* (2013.01); *H02M 2003/1566* (2013.01); *H02M 2003/1586* (2013.01)

(58) Field of Classification Search
USPC ......................... 323/242, 284, 285, 288, 326
See application file for complete search history.

(56) References Cited

U.S. PATENT DOCUMENTS

| | | | | |
|---|---|---|---|---|
| 2008/0218145 | A1* | 9/2008 | Xu | H02M 3/156 323/288 |
| 2009/0001952 | A1* | 1/2009 | Chang | H02M 3/156 323/280 |
| 2009/0140711 | A1 | 6/2009 | Philbrick et al. | |
| 2010/0270995 | A1 | 10/2010 | Laur et al. | |
| 2013/0293212 | A1 | 11/2013 | Philbrick et al. | |
| 2014/0049240 | A1* | 2/2014 | Chen | G05F 1/10 323/282 |

OTHER PUBLICATIONS

Gang Chen et al., "System and Method for Controlling Switching Power Supply," U.S. Appl. No. 15/461,658, filed Mar. 17, 2017.

* cited by examiner

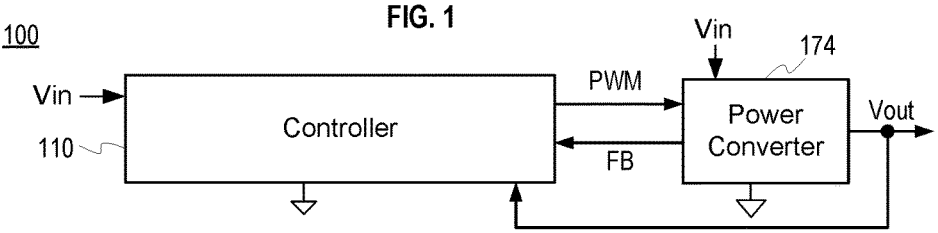
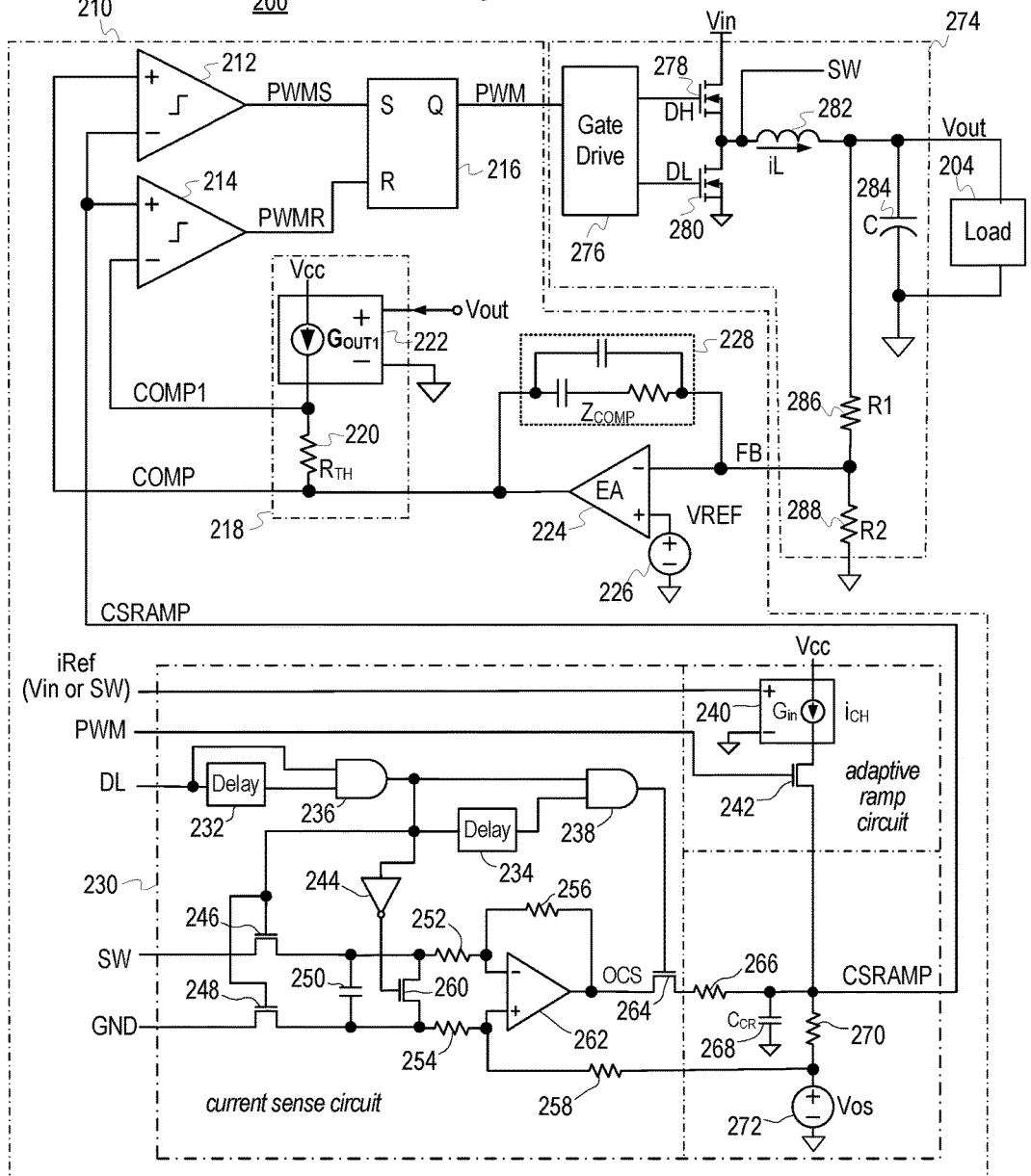

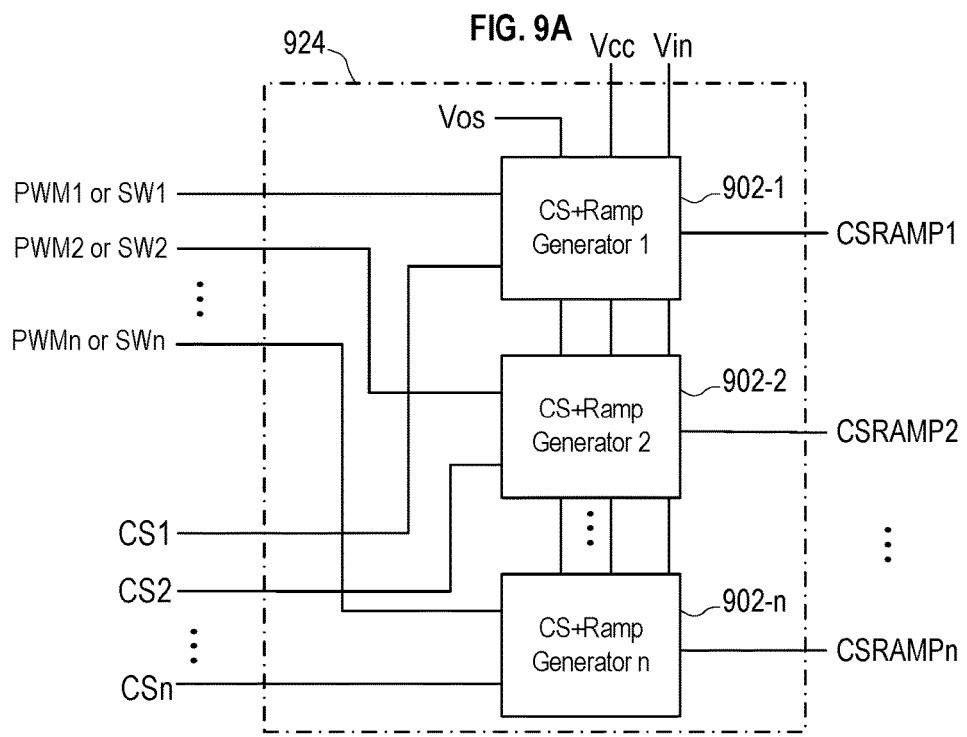
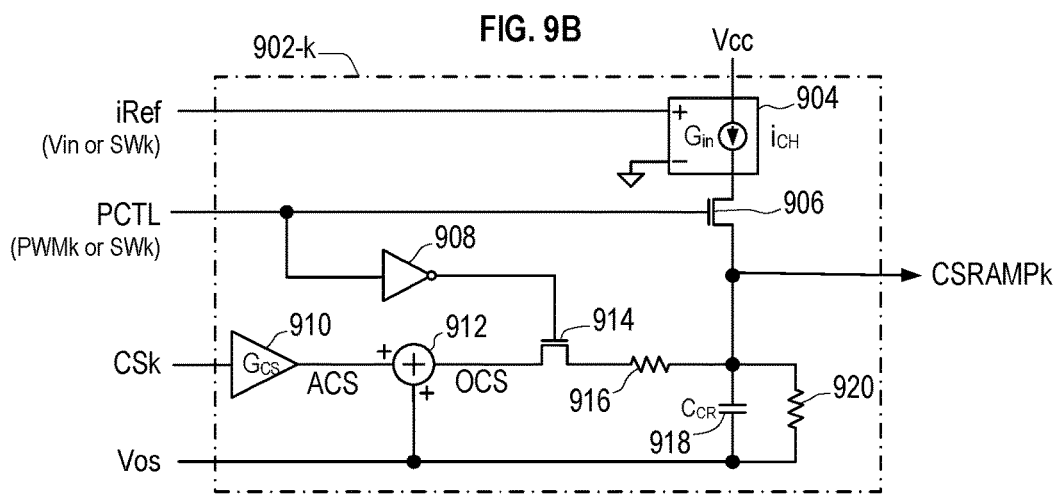

ions and description are to be regarded as illustrative in
PULSE WIDTH CONTROL FOR SWITCHING MODE POWER CONVERTERS

CROSS-REFERENCES TO RELATED APPLICATIONS

The present invention claims the benefit of U.S. Provisional Application No. 62/506,679, filed May 16, 2017, which is incorporated by reference herein for all purposes.

FIELD OF THE DISCLOSURE

The present disclosure relates generally to switched voltage regulators and switched power converters, and more particularly to single-phase and multi-phase Direct Current (DC) to DC power converters using Pulse Width Modulation (PWM).

BACKGROUND

The present disclosure relates, in general, to electronics, and more particularly, to circuits and method for providing power to electronic devices. Various methods and structures may be used in switching power supply controllers, such as pulse width modulated (PWM) controllers or pulse frequency modulation (PFM) controllers. The switching power supply controllers function to regulate an output voltage to a desired value.

Fixed frequency controllers, such as fixed-frequency PWM controllers, may not respond quickly to load transients. For example, a fixed-frequency PWM controller may not provide a consistent response to a rapid step change in the load. Also, fixed-frequency PWM controllers may have beat frequencies that resulted in noise in the output voltage.

A Ramp Pulse Modulation (RPM) based controller is a type of PWM controller that can provide improved transient response by determining a duration of phase pulses using an average current of the output voltage.

In some RPM based controllers, an error signal used in the regulation of the output voltage requires a wide operational range when a target voltage value of the output voltage is variable, which increases the difficulty and complexity of the design. Furthermore, RPM based controllers may require external compensation (that is, a compensation circuit outside of the integrated circuit that includes the controller) of the error amplifier used to produce the error signal in order to meet tight regulation requirements under various transient conditions, which may increase a parts count, a size, and a cost of the power converter and increase a pin count of the integrated circuit that contains the error amplifier. Finally, a multi-phase RPM controllers may not be scalable, that is, it may be difficult or impossible to increase the number of phases used past a fixed limit.

BRIEF DESCRIPTION OF THE FIGURES

In the accompanying figures, like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

FIG. 1 illustrates a Pulse Width Modulation (PWM) power supply circuit according to an embodiment.

FIG. 2 illustrates a PWM power conversion circuit according to an embodiment.

FIG. 9A illustrates a multi-phase Current Sense and Ramp (CSR) generator circuit according to an embodiment.

FIG. 9B illustrates a CSR generator circuit according to an embodiment.

Figure 3:
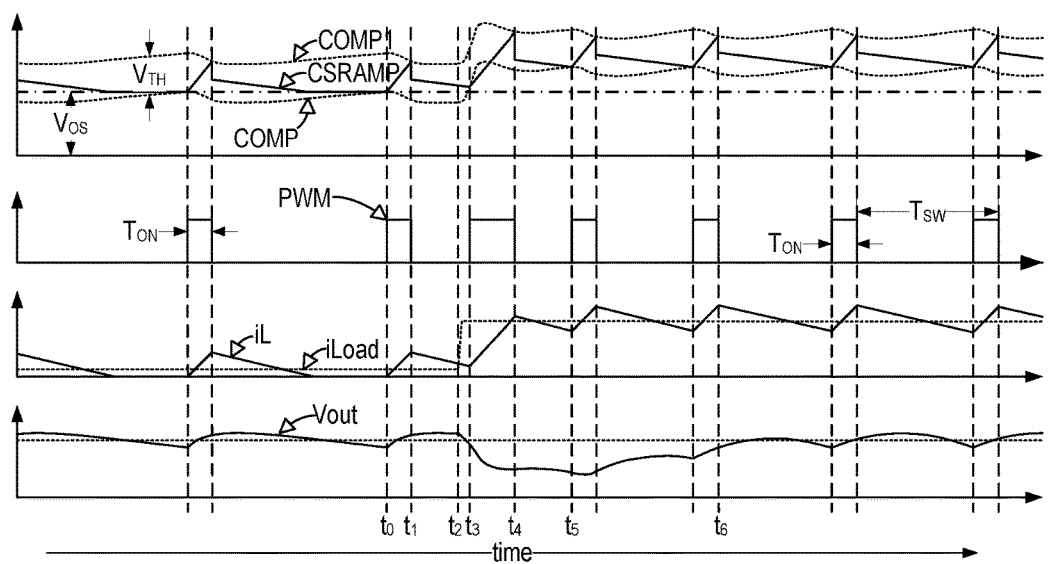
FIG. 3 illustrates voltages and currents during an operation of the PWM power conversion circuit of FIG. 2 according to an embodiment.

Those skilled in the field of the present disclosure will appreciate that elements in the figures are illustrated for simplicity and clarity and have not necessarily been drawn to scale. For example, the dimensions of some of the elements in the figures may be exaggerated relative to other elements to help to improve understanding of the embodiments.

The apparatus and method components have been represented where appropriate by conventional symbols in the drawings, showing only those specific details that are pertinent to understanding the embodiments. This avoids obscuring the disclosure with details that will be readily apparent to those of ordinary skill in the art having the benefit of the disclosures herein. The details of well-known elements, structures, or processes that are necessary to practice the embodiments and that are well known to those of skill in the art may not be shown and should be assumed present unless otherwise indicated.

DETAILED DESCRIPTION

Embodiments relate generally to electronics, and more particularly, to Pulse Width Modulation (PWM) controllers including PWM controllers included in an integrated circuit.

In the following detailed description, certain illustrative embodiments have been illustrated and described. As those skilled in the art would realize, these embodiments may be modified in various different ways without departing from the scope of the present disclosure. Accordingly, the drawings and description are to be regarded as illustrative in nature and not restrictive. Like reference numerals designate like elements in the specification.

Embodiments include PWM controllers that may provide, among other advantages, a wide range of output voltages using an error signal having a limited voltage range, an internally compensated error amplifier, and modularity so that the PWM controller that may be used to provide multi-phase control for an arbitrary number of phases.

In an embodiment of a switching power converter, a PWM pulse is initiated when a combined ramp signal becomes less than an output feedback error voltage. The combined ramp signal may be a Current Sense and Ramp (CSR) signal produced according to a sum of a ramp signal and a current-sense signal. The PWM pulse is ended when the combined ramp signal exceeds a threshold voltage. The threshold voltage may be produced by adding a value corresponding to an output voltage of the power converter to the output feedback error voltage.

In an embodiment of a switching power converter, a modular PWM power conversion circuit includes a plurality of substantially identical PWM modules, wherein a module of the plurality of substantially identical PWM modules acts as a master PWM module, the remainder of the modules of the plurality of substantially identical PWM modules act as slave modules, the master PWM module provides an error signal to each of the plurality of substantially identical PWM modules, and the sequencing of the respective phases of the modules of the plurality of substantially identical PWM modules is controlled using daisy-chained clock signals.

FIG. 1 is a block diagram of a switching power supply 100 according to an embodiment. The switching power supply 100 includes a controller 110 and a power converter 174.

The power converter 174 converts an input signal (or an input voltage) Vin and provides an output signal (or an output voltage) Vout to a load (not shown). The load may include one or more integrated circuits (ICs). In an embodiment, the output voltage Vout is used as a supply voltage to one or more of a Central Processing Unit (CPU), a Graphics Processing Unit (GPU), a Universal Serial Bus (USB), a memory integrated circuit, and the like. The power converter 174 also provides a feedback signal FB indicating of a level of the output voltage Vout.

The controller 110 generates a pulse width modulated (PWM) signal (or a modulation signal) PWM according to the feedback signal FB. The controller 110 may also generate the PWM signal PWM according to one or both of the input signal Vin and the output voltage Vout. The controller 110 generates the PWM signal PWM in order to provide the output voltage Vout complying with to one or more target parameters, such as a reference voltage, a current limit, and the like.

FIG. 2 schematically illustrates a power supply controller 200 in accordance with an embodiment. In the illustrative embodiment, a single-phase synchronous buck converter (a power converter 274) is employed to convert an input voltage Vin to an output voltage Vout and deliver power to a load 204.

The power converter 274 operates in response to a PWM signal PWM generated by a controller 210, and includes a gate drive circuit 276, a high drive transistor 278, and a low drive transistor 280. The gate drive circuit 276 generates a high side drive signal DH and a low side drive signal DL according to a value of the PWM signal PWM. The high side drive signal DH and the low side drive signal DL are respectively connected to control terminals (e.g., gates) of a high drive transistor 278 and a low drive transistor 280. In an embodiment, the high drive transistor 278 and a low drive transistor 280 include Metal-Oxide-Semiconductor Field Effect Transistors (MOSFETs), such as the n-channel MOSFETs shown in FIG. 2.

In an embodiment, when the PWM signal PWM has a first logic value (e.g., a logic high value), the gate drive circuit 276 generates a high side drive signal DH to turn the high drive transistor 278 on and a low side drive signal DL to turn the low drive transistor 280 off. Because the high drive transistor 278 is on and the low drive transistor 280 is off, an inductor current iL may flow from the input voltage Vin to the output capacitor 284 and the load 204, and energy is stored in a magnetic field of the inductor 282. When the PWM signal PWM has a second logic value (e.g., a logic low value), the gate drive circuit 276 generates a high side drive signal DH to turn the high drive transistor 278 off and a low side drive signal DL to turn the low drive transistor 280 on. Because the high drive transistor 278 is off, and the low drive transistor 280 is on, and the energy stored in the magnetic field of the inductor 282 may be transferred to the output capacitor 284 and the load 204.

The controller 210 includes a PWM latch 216, first and second comparators 212 and 214, an error amplifier (EA) 224, a reference voltage generator 226, a threshold generator circuit 218, and a combined ramp (CSR) generator circuit 230.

The EA 224 uses a feedback voltage FB and a reference voltage Vref provided by the reference voltage generator 226 to generate a compensated error signal COMP (referred to herein as the error signal COMP).

A compensation resistor-capacitor (RC) network 228 may be coupled between a negative input and an output of the EA 224. In embodiments, because the range of the feedback voltage FB and the error signal COMP remain within respective limited ranges even when the values of the input voltage Vin and/or the output voltage Vout vary substantially, the compensation RC network 228 may be provided in an integrated circuit including the controller 210.

A voltage divider coupled to the output voltage Vout and comprising first and second resistors 286 and 288 may be used to provide the feedback voltage FB to the negative input of the EA 224. The voltage reference Vref may be provided to a positive input of the EA 224.

The threshold generator circuit 218 generates a threshold signal COMP1 according to the output voltage Vout and the error signal COMP. The threshold generator circuit 218 includes an adaptive current generator 222 that provides a current according to the output voltage Vout to a threshold resistor 220, thereby producing a voltage difference according to a product of the output voltage Vout and the resistance of the threshold resistor 220. The voltage different corresponds to a threshold voltage $V_{TH}$ and is added to the value of the error signal COMP to produce a threshold signal COMP1.

The CSR generator circuit 230 provides a Current Sense and Ramp (CSR) signal CSRAMP to the comparators 212 and 214. In the embodiment of FIG. 2, the CSR generator circuit 230 includes a low-side MOSFET current sense circuit and an adaptive ramp circuit.

The low-side MOSFET current sense circuit of FIG. 2 measures a voltage across a low-side MOSFET such as the low-side transistor 280 and includes first and second sampling switches 246 and 248, a sampling capacitor 250, a sampling reset switch 260, and a differential amplifier 262. The differential amplifier 262 is coupled to a feedback network comprising third, fourth, fifth, and sixth resistors 252, 254, 256, and 258. The first and second sampling switches 246 and 248 and reset switch 260 may be MOSFETs.

The low-side MOSFET current sense circuit is controlled using first and second delay circuits 232 and 234, first and second AND gates 236 and 238, and an inverter 244. In response to a low-side gate driver signal DL going high and after a delay of the first delay circuit 232, the output of the first AND gate 236 goes high, turning on the first and second sampling switches 246 and 248 and turning off the reset switch 260. When the first and second sampling switches 246 and 248 are on and the reset switch 260 is off, the sampling capacitor 250 samples a conduction voltage across a low-side MOSFET, such as the low drive transistor 280 of the power converter 274, the conduction voltage across the low-side MOSFET corresponding to a difference between switched node signal SW and a ground signal GND.

When the low-side gate driver signal DL is low, the output of the first AND gate 236 is low, the first and second sampling switches 246 and 248 are turned off, and the reset switch 260 is on. As a result, a voltage across the sampling capacitor 250 is reset to zero.

The differential amplifier 262 produces a current sense (CS) output OCS corresponding to the voltage across the sampling capacitor 250 (that is, to the sampled conduction voltage of the low-side MOSFET) and an offset voltage Vos generated by an offset voltage generator 272.

In response to the output of the first AND gate 236 going high and after a delay of the second delay circuit 234, an output of the second AND gate 238 goes high, turning on a sense switch 264. The sense switch 264 may be a MOSFET. While the sense switch 264 is on, the seventh resistor 266, having a low resistance, is used to smooth the connection transient from the current sense output OCS to the ramp capacitor 268.

In the adaptive ramp circuit, an adaptive current source 240 produces an adaptive current according to the input voltage Vin or, in another embodiment, a value of the switched node signal SW. When the PWM signal PWM is asserted, the adaptive current changes the ramp capacitor 268 at a slew rate proportional to the input voltage Vin or, in the other embodiment, the value of the switched node signal SW. In embodiments, the value of the switched node signal SW corresponds to the value of the input voltage Vin when the high-side gate driver signal DH is high and the transistor 278 is on, that is, when the PWM signal PWM is asserted.

An eighth resistor 270 is coupled between the ramp capacitor 268 and the offset voltage Vos to provide a DC bias for the CSR signal CSRAMP, which provides for diode emulation operation of the low drive transistor 280 (i.e., a low-side MOSFET).

A PWM set signal PWMS generated by the first comparator 212 is asserted when the value of the error voltage COMP goes higher than the value of the CSR signal CSRAMP. The PWM set signal PWMS is coupled to a set input S of the PWM latch 216. When the PWM set signal PWMS is asserted, a pulse is initiated on the PWM signal PWM (that is, the PWM signal PWM goes high or is turned on.)

A PWM reset signal PWMR generated by the second comparator 214 is asserted when the value of the CSR signal CSRAMP exceeds a value of the threshold signal COMM. The PWM reset signal PWMR is coupled to a reset input R of the PWM latch 216. When the PWM reset signal PWMR is asserted, a pulse on the PWM signal PWM is ended (that is, the PWM signal PWM goes low or is turned off).

A minimum off time circuitry (not shown) may be employed to assure the off time in PWM signal PWM, following each pulse, is greater than or equal to a minimum duration, which may be necessary for normal operation of gate drivers and current sense circuits.

FIG. 3 illustrates voltages and currents during operation of the PWM power conversion circuit of FIG. 2 according to an embodiment. The voltages shown include values of the error signal COMP and the threshold signal COMP1, which latter is higher than the error signal COMP by the threshold voltage of $V_{TH}$. The voltages shown also include values of the CSR signal CSRAMP, the PWM signal PWM, and the output voltage Vout. The currents shown include an inductor current iL through the inductor 282 and a load current iLoad through the load 204.

Before a zero$^{th}$ time t0, the load current iLoad is very low and the inductor current iL is discontinuous due to diode emulation operation of the low-side MOSFET; that is, the power converter 274 is operating in a Discontinuous Conduction Mode (DCM). It takes more time for Vout to drop under this condition compared to a Continuous Conduction Mode (CCM) operation that occurs during intermediate and heavy load conditions. In the interval immediately before the initial time t0, the error signal COMP is below the level of the CSR signal CSRAMP, and as a result a PWM pulse is not initiated in that interval.

At the zero$^{th}$ time t0, in response to the error signal COMP being above the level of the CSR signal CSRAMP, a first PWM pulse is initiated by the assertion of the PWM signal PWM. In response to the PWM signal PWM being asserted, the CSR signal CSRAMP ramps up in the interval between the zero$^{th}$ time t0 and a first time t1.

At the first time t1, in response to the CSR signal CSRAMP being above the level of the threshold signal COMP1, the first PWM pulse is ended by de-assertion of the PWM signal PWM.

At a second time t2, a step load transient occurs in the load current iLoad, causing the output capacitor 284 to discharge more rapidly. This causes a rapid drop in the output voltage Vout that leads to a marked increase in the error signal COMP.

At a third time t3, in response to the error signal COMP being above the CSR signal CSRAMP, a second PWM pulse is initiated by asserting the PWM signal PWM. In response to the PWM signal PWM being asserted the CSR signal CSRAMP ramps up in the interval between the third time t3 and a fourth time t4.

At the fourth time t4, in response to the CSR signal CSRAMP being above the level of the threshold signal COMP1, the second PWM pulse is ended by the de-assertion of the PWM signal PWM. The longer duration of the second PWM pulse relative to the first PWM pulse provides more current to the inductor 282 to support the increase in the load current iLoad.

After the fourth time t4, error signal COMP rises faster than in normal (steady-state) operation because the output voltage Vout has not yet recovered from an undershoot caused by the load step in the load current iLoad.

At a fifth time t5, in response to the error signal COMP becoming higher than the CSR signal CSRAMP again, a third PWM pulse is initiated by the assertion of the PWM signal PWM.

After a couple of switching cycles (such as at a sixth time t6) the output voltage Vout comes back to the regulation level and the power converter 274 reaches a new steady state of CCM operation at a heavy load.

Two factors determining the on-time pulse width $T_{ON}$ are 1) the threshold voltage $V_{TH}$ and 2) the slew rate of the CSR signal CSRAMP ($SR_{CSRAMP}$) when PWM is on (such as between the zero$^{th}$ time t0 and first time t1, between the third time t3 and fourth time t4, and so on.) In an embodiment, the threshold voltage $V_{TH}$ is equal to k times the output voltage Vout, and the CSR signal CSRAMP slew rate $SR_{CSRAMP}$ when the PWM signal PWM is on is equal to k time the input voltage Vin divided by a nominal switching period $T_{SW}$. In an illustrative embodiment, k=0.1.

Figure 4:
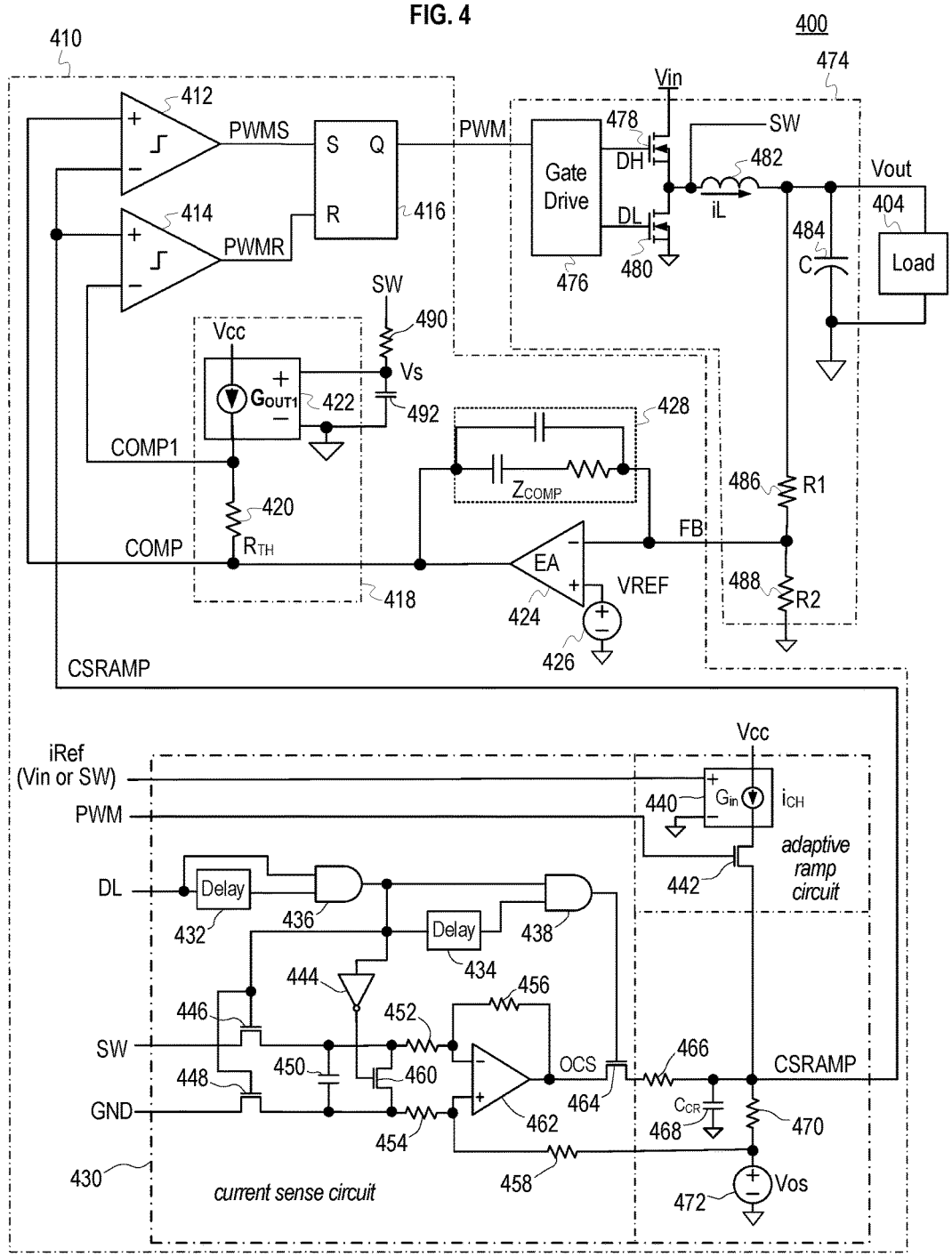
FIG. 4 illustrates a PWM power conversion circuit according to another embodiment.

FIG. 4 is a schematic of a PWM power conversion circuit 400 according to another embodiment. Unless otherwise noted, elements of FIG. 4 having reference characters of the form "4XX" correspond to elements of FIG. 2 having reference characters of the form "2XX" and may be are substantially identical in configuration and function. For example, the first comparator 412 of FIG. 4 is substantially identical to the first comparator 212 of FIG. 2, the power converter 474 of FIG. 4 is substantially identical to the power converter 274 of FIG. 2, and so on. Accordingly, descriptions of the elements of FIG. 4 that have corresponding substantially identical elements in FIG. 2 are omitted for brevity.

In the embodiment of FIG. 4, instead of providing the output voltage Vout to the threshold generator circuit 418 to generate the threshold signal COMP1, a filter circuit uses the switched node signal SW to generate an output approximation signal Vs having a similar DC voltage as the output voltage Vout. In the illustrative embodiment of the filter shown in FIG. 4, a switch filter resistor 490 is coupled to a switch filter capacitor 492 to low-pass filter the switched node signal SW, and a time constant of the filter including the switch filter resistor 490 and switch filter capacitor 492 is much higher than the nominal switching period $T_{SW}$. For example, the time constant of the filter may be 5 or more times the nominal switching period $T_{SW}$.

Figure 5:
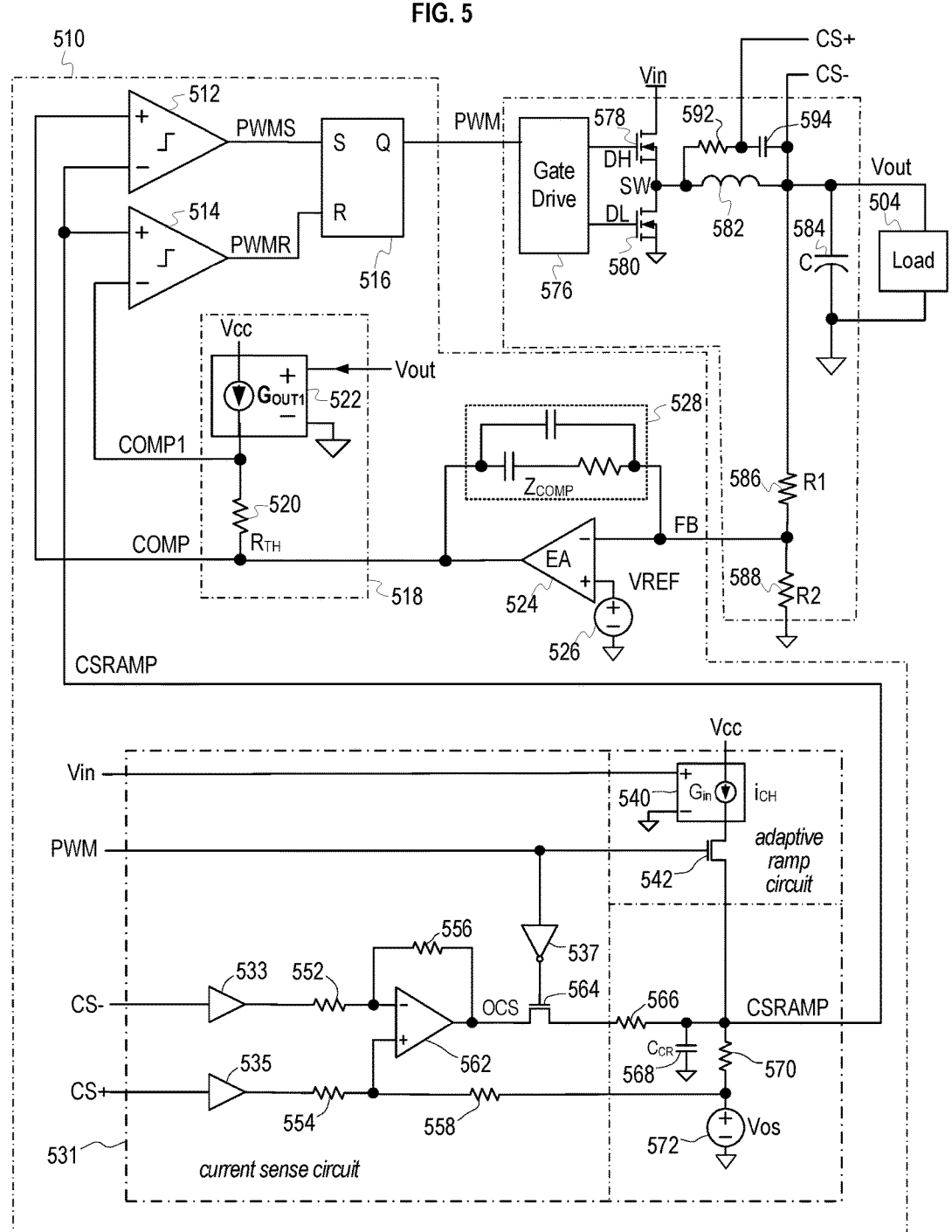
FIG. 5 illustrates a PWM power conversion circuit according to another embodiment.

FIG. 5 is a schematic of a PWM power conversion circuit according to another embodiment. The embodiment of FIG. 5 incorporates another implementation of current sense, but embodiments are not limited thereto. Unless otherwise noted, elements of FIG. 5 having reference characters of the form "5XX" correspond to elements of FIG. 2 having reference characters of the form "2XX" and may be are substantially identical in configuration and function. For example, the first comparator 512 of FIG. 5 is substantially identical to the first comparator 212 of FIG. 2, the gate driver circuit 576 of FIG. 5 is substantially identical to the gate driver circuit 276 of FIG. 2, and so on. Accordingly, descriptions of the elements of FIG. 5 having corresponding substantially identical elements in FIG. 2 are omitted for brevity.

In FIG. 5, an inductor current-sense approach is employed in the combined ramp generator. The inductor current sensor includes a sense resistor 592 and a sense capacitor 594. The sense resistor 592 has a first end connected to a first end of an inductor 582 and a second end outputting a first current sense signal CS+. The sense capacitor 594 has a first end connected to the second end of the sense resistor 592 and a second end outputting the second current sense signal CS−. The second end of the sense capacitor 594 is also connected to a second end of the inductor 582.

A voltage $V_{CS}$ across the sense capacitor 594, which corresponds to a voltage difference between the first and second sense signals CS+ and CS−, can be represented by:

$$V_{CS} = \frac{(R_L + sL) * i_L}{(1 + s * R_f * C_f)} = R_L * \frac{(1 + sT_0)}{(1 + sT_1)} * i_L \quad \text{Equation 1}$$

wherein $R_L$ denotes a DC resistance value of the inductor 582, L denotes an inductance value of the inductor 582, $R_f$ denotes a resistance value of the sense resistor 592, $C_f$ denotes a capacitance value of the sense capacitor 594, $i_L$ denotes a magnitude of an inductor current in the inductor 582, a first time constant $T_0$ is equal to $L/R_L$, and a second time constant $T_1$ is equal to $R_f*C_f$. When the first time constant $T_0$ is substantially equal to the second time constant $T_1$, the voltage $V_{CS}$ across the sense capacitor 594 is proportional to the magnitude $i_L$ of the inductor current, and the inductor current sensor including the sense capacitor 594 can generate the first and second current sense signals CS+ and CS− indicative of the magnitude of the inductor current $i_L$ in the inductor 582.

To sense the first and second current sense signals CS+ and CS−, the CSR generator circuit 531 includes a current sense circuit including first and second buffer amplifiers 533 and 535, an inverter 537, a switching device 564, third, fourth, fifth, and sixth resistors 552, 554, 556, and 558, and a differential amplifier 562. During an off-time duration of a PWM signal PWM, the CSR generator circuit 531 receives the first and second current sense signals CS+ and CS− and amplifies the difference between the first and second current sense signals CS+ and CS− to provide the amplified signal OCS to a first end of a ramp capacitor 568 through the switching device 564 and the seventh resistor 566. Operation of the CSR generator circuit 531 is otherwise similar to operation of the CSR generator circuit 230 of FIG. 2.

Figure 6:
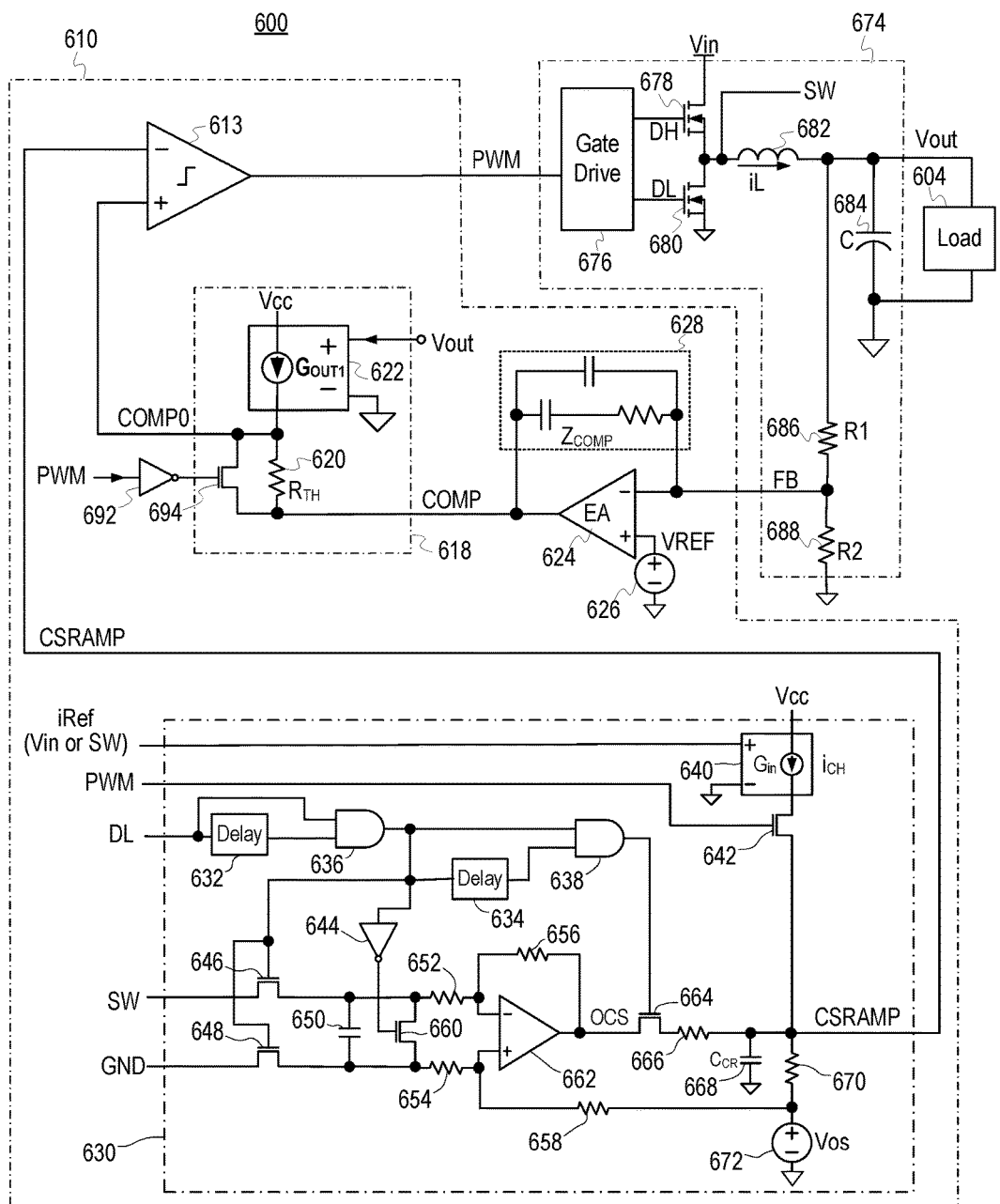
FIG. 6 illustrates a PWM power conversion circuit according to another embodiment.

FIG. 6 is a schematic of a PWM power conversion circuit 600 according to another embodiment. Unless otherwise noted, elements of FIG. 6 having reference characters of the form "6XX" correspond to elements of FIG. 2 having reference characters of the form "2XX" and may be substantially identical in configuration and function. For example, the gate driver circuit 676 of FIG. 6 is substantially identical to the gate driver circuit 276 of FIG. 2, the CSR generator circuit 630 of FIG. 6 is substantially identical to the CSR generator circuit 230 of FIG. 2, and so on. Accordingly, descriptions of the elements of FIG. 6 having corresponding elements in FIG. 2 are omitted for brevity.

To remove one comparator from the implementation relative to the embodiment shown in FIG. 2, the comparator 613 in FIG. 6 performs the roles of both the first and second comparators 212 and 214 of FIG. 2 (and removes the need for the PWM latch 216 of FIG. 2) with assistance from additional components including a comparator mode switch 694 and an inverter 692.

When the PWM signal PWM is off, the comparator mode switch 694 is turned on and shorts comparison signal COMP0 to error signal COMP, so that a value of the comparison signal COMP0 is the same as a value of the error signal COMP. When the PWM signal PWM is on, comparator mode switch 694 is off and the value of the comparison signal COMP0 is the same as a value of the threshold signal COMP1 of FIG. 2.

As a result, when the PWM signal PWM is off, the PWM signal PWM remains off until the value of the CSR signal CSRAMP drops below the value of the error signal COMP. In response to the CSR signal CSRAMP dropping below the error signal COMP, the PWM signal PWM goes high (i.e., is turned on).

When the PWM signal PWM is on, the PWM signal PWM remains on until the value of the CSR signal CSRAMP rises above the value of the threshold signal COMP1. In response to the CSR signal CSRAMP rising above the threshold signal COMP1, the PWM signal PWM goes low (i.e., is turned off).

Other operations of the circuit in FIG. 6 are substantially identical to the operations described with respect to FIG. 2. Accordingly, the PWM power conversion circuit 600 operates in the manner described with respect to FIG. 3.

Embodiments include multi-phase controllers, as described below.

Figure 7:
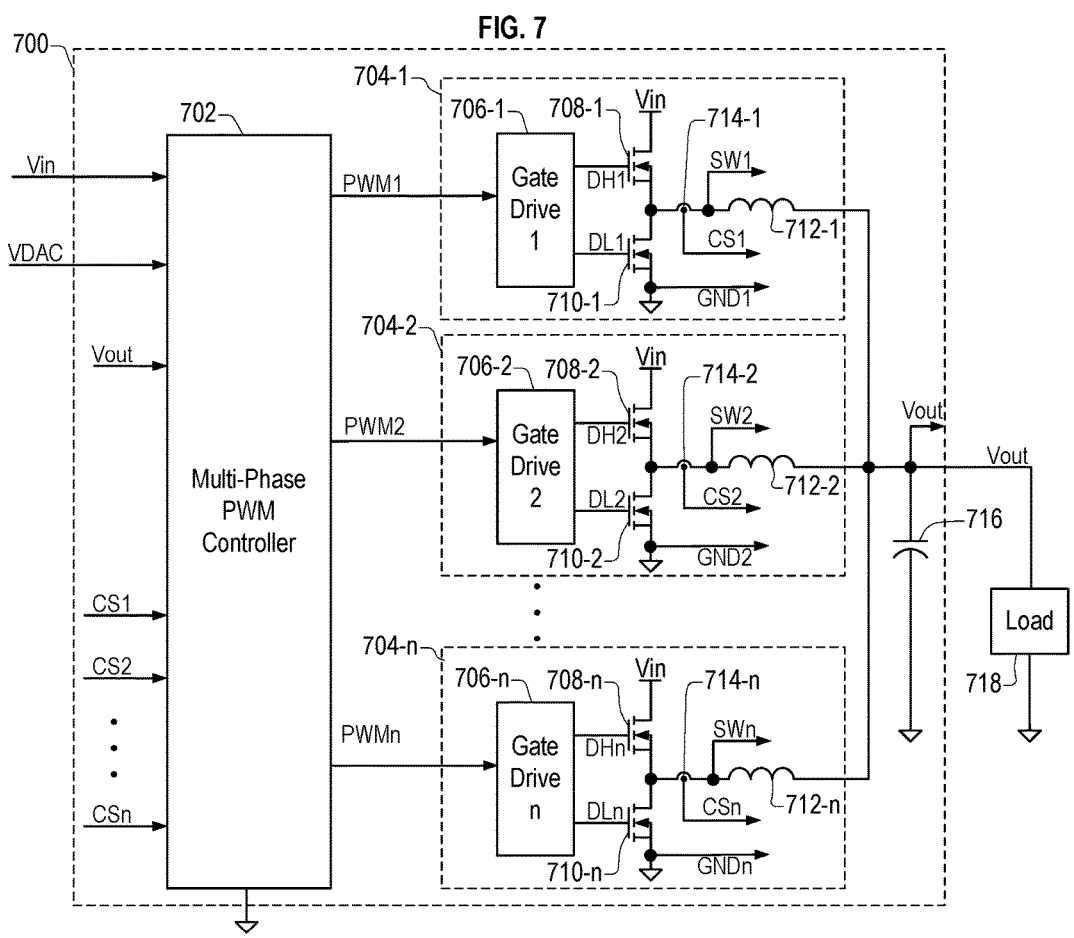
FIG. 7 illustrates a multi-phase PWM power supply circuit according to an embodiment.

FIG. 7 illustrates a multi-phase voltage regulator (VR) circuit 700 (hereinafter, the VR circuit 700) according to an embodiment. The VR circuit 700 receives an input voltage Vin and a reference voltage VDAC and supplies an output voltage Vout to a load 718.

The VR circuit 700 includes a multi-phase controller 702 (hereinafter, the controller 702), a plurality of phase circuits 704-1 to 704-$n$, and an output capacitor 716. The controller 702 operates to produce the output voltage Vout by controlling the first to $n^{th}$ phase circuits 704-1 to 704-$n$ to provide their respective currents to the output capacitor 716.

In particular, the controller 702 generates first to $n^{th}$ Pulse Width Modulation (PWM) signals PWM1 to PWMn that respectively control operation of the first to $n^{th}$ phase circuits 704-1 to 704-$n$. In an embodiment, the controller 702 generates the first to $n^{th}$ PWM signals PWM1 to PWMn according to values of the reference voltage VDAC, the output voltage Vout, and first to $n^{th}$ current sense (CS) signals CS1 to CSn.

The first phase circuit 704-1 includes a first gate drive circuit 706-1, a first high drive transistor 708-1, a first low drive transistor 710-1, a first inductor 712-1, and a first current node circuit 714-1. In an embodiment, the first high drive transistor 708-1 and the first low drive transistor 710-1 are Field Effect Transistors (FETs), such as Metal Oxide Semiconductor FETs (MOSFETs). In an embodiment, the first high drive transistor 708-1 and the first low drive transistor 710-1 are n-channel MOSFETs (n-MOSFETs).

The first gate drive circuit 706-1 generates a first high side drive signal DH1 and a first low side drive signal DL1 according to a value of the first PWM signal PWM1. The first high side drive signal DH1 and a first low side drive signal DL1 are respectively connected to control terminals (e.g., gates) of the first high drive transistor 708-1 and first low drive transistor 710-1, respectively.

In an embodiment, when the first PWM signal PWM1 has a first value (such as a high or logical-true value), the first gate drive circuit 706-1 generates a first high side drive signal DH1 to turn the first high drive transistor 708-1 on and a first low side drive signal DL1 to turn the first low drive transistor 710-1 off. When the first PWM signal PWM1 has a second value (such as a low or logical-false value), the first gate drive circuit 706-1 generates a first high side drive signal DH1 to turn the first high drive transistor 708-1 off and a first low side drive signal DL1 to turn the first low drive transistor 710-1 on.

A first conduction terminal (e.g. a drain) of the first high drive transistor 708-1 is connected to the input voltage Vin. A second conduction terminal (e.g. a source) of the first high drive transistor 708-1 is coupled to a first end of a first inductor 712-1 through a first current node circuit 714-1. A second end of the first inductor 712-1 is connected to the output capacitor 716.

A first conduction terminal (e.g. a drain) of the first low drive transistor 710-1 is also coupled to the first end of the first inductor 712-1 through the first current node circuit 714-1. A second conduction terminal (e.g. a source) of the first low drive transistor 710-1 is connected to ground.

A first switched node signal SW1 is generated at the first end of the first inductor 712-1. The first current node circuit 714-1 produces the first current sense signal CS1. In an embodiment, the first current sense signal CS1 is an amplified current sense voltage from a current sense resistor. In another embodiment, the first current sense signal CS1 is an amplified current sense voltage from a DC resistance of the first inductor 712-1. In an embodiment, a voltage value of the first current sense signal CS1 corresponds to an amount of current passing through the first inductor 712-1.

When the first PWM signal PWM1 has the first (e.g., high) value, the first high drive transistor 708-1 is on, the first low drive transistor 710-1 is off, current may flow from the input voltage Vin to the output capacitor 716 and the load 718, and energy is stored in a magnetic field of the first inductor 712-1. When the first PWM signal PWM1 has the second (e.g., low) value, the first high drive transistor 708-1 is off, and the first low drive transistor 710-1 is on, and the energy stored in the magnetic field of the first inductor 712-1 may be transferred to the output capacitor 716 and the load 718.

The second phase circuit 704-2 includes a second gate drive circuit 706-2, a second high drive transistor 708-2, a second low drive transistor 710-2, a second inductor 712-2, and a second current node circuit 714-2. The second phase circuit 704-2 receives the second PWM signal PWM2 and generates the second current sense signal CS2.

The second phase circuit 704-2 is configured similarly to the first phase circuit 704-1. The second phase circuit 704-2 operates in the manner described for first phase circuit 704-1. A second switched node signal SW2 is generated at a first end of the second inductor 712-2.

The $n^{th}$ phase circuit 704-$n$ includes an $n^{th}$ gate drive circuit 706-$n$, an $n^{th}$ high drive transistor 708-$n$, an $n^{th}$ low drive transistor 710-$n$, an $n^{th}$ inductor 712-$n$, and an $n^{th}$ current node circuit 714-$n$. The $n^{th}$ phase circuit 704-$n$ receives the $n^{th}$ PWM signal PWMn and generates the $n^{th}$ current sense signal CSn.

The $n^{th}$ phase circuit 704-$n$ is configured similarly to the first phase circuit 704-1. The $n^{th}$ phase circuit 704-$n$ operates in the manner described for first phase circuit 704-1. An $n^{th}$ switched node signal SWn is generated at a first end of the $n^{th}$ inductor 712-$n$.

In an embodiment, each of the first to $n^{th}$ gate drive circuits 706-1 to 706-$n$ operates to introduce a dead time between assertions of the respective high drive signal and low drive signal. That is, each of the first to $n^{th}$ gate drive circuits 706-1 to 706-$n$ operates so that a first dead time elapses after the respective high drive transistor is turned off before the respective low drive transistor is turned on, and a second dead time elapses after the respective low drive transistor is turned off before the respective high drive transistor is turned on.

In an embodiment, the controller 702 further receives the first to $n^{th}$ switched node signals SW1 to SWn and uses the first to $n^{th}$ switched node signals SW1 to SWn to generate the first to $n^{th}$ PWM signals PWM1 to PWMn.

In an embodiment, the controller 702 further receives the first to $n^{th}$ low side drive signals DL1 to DLn and uses the first to $n^{th}$ low side drive signals DL1 to DLn to generate the first to $n^{th}$ PWM signals PWM1 to PWMn.

FIG. 7 illustrates a partitioning of the VR circuit 700 according to an embodiment, but embodiments are not limited thereto. For example, in an embodiment, an integrated circuit may include the controller 702 and the first to $n^{th}$ gate drive circuits 706-1 to 706-*n*. In an embodiment, the integrated circuit includes a Digital to Analog Converter (DAC) configured to provide the reference voltage VDAC according to an indication of a target output voltage value. In an embodiment, the integrated circuit may include control and interface circuits. In an embodiment, the integrated circuit may include over-current, over-voltage, under-voltage, and thermal protection circuits.

FIG. 7 illustrates the VR circuit 700 including three phases, but embodiments are not limited thereto. In an embodiment, the number of phases of the VR circuit 700 is configurable up to a predetermined maximum number. In an embodiment, the VR circuit 700 includes 2, 4, 5, or more phases.

Figure 8:
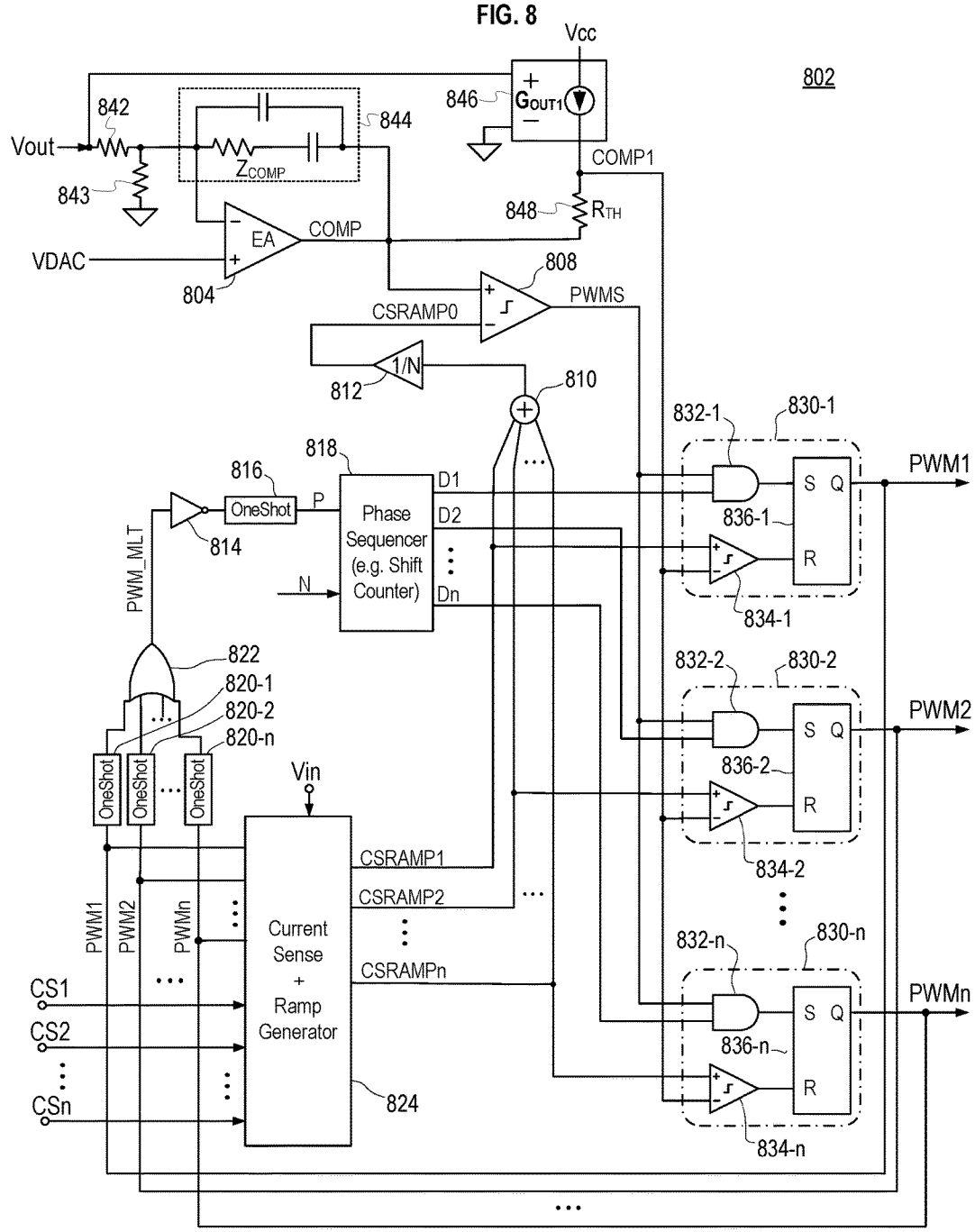
FIG. 8 illustrates a multi-phase PWM controller circuit according to an embodiment.

FIG. 8 illustrates a multi-phase PWM controller circuit 802 (hereinafter, controller 802) according to an embodiment. The controller 802 is suitable or use as the multi-phase PWM controller 702 of FIG. 7.

The controller 802 receives an input voltage Vin, an output voltage Vout, and first to $n^{th}$ current sense (CS) signals CS1 to CSn. The controller 802 may also receive a number of phases signal N indicating a number of phases to control, wherein N is less than or equal to n.

In an embodiment, the controller 802 also receives first to $n^{th}$ switched node signals SW1 to SWn, such as the first to $n^{th}$ switched node signals SW1 to SWn shown in FIG. 7. In an embodiment, the controller 802 receives first to $n^{th}$ low side drive signals DL1 to DLn, such as the first to $n^{th}$ low side drive signals DL1 to DLn shown in FIG. 7.

The controller 802 generates first to $n^{th}$ Pulse Width Modulation (PWM) signals PWM1 to PWMn according to the received signals. In an embodiment, the number of PWM signals generated is equal to a value of the number of phases signal N.

The controller 802 includes an Error Amplifier (EA) 804, an error comparator 808, a Current Sense and Ramp (CSR) summing circuit 810, and a scaler circuit 812. The controller 802 further includes an inverter 814, a common one-shot circuit 816, a phase sequencer circuit 818, first to $n^{th}$ phase one-shot circuits 820-1 to 820-*n*, and an OR gate 822. The controller 802 further includes a CSR signal generator 824 and first to $n^{th}$ Pulse Width Modulation (PWM) control circuits 830-1 to 830-*n*.

The controller 802 includes a compensation network 844 and a voltage divider network comprising a first resistor 842 receiving the output voltage Vout on one terminal and having a second terminal coupled to a second resistor 843. The controller 802 further includes a programmable current source 846 and a threshold resistor 848. In an embodiment, one or more of the first and second resistors 842 and 843 are external to an integrated circuit that includes other portions of the controller 802.

The EA 804 receives the output voltage Vout through the first resistor 842 and receives the reference voltage VDAC, and generates an error signal COMP corresponding to the difference between the two received signals. The EA 804 includes a compensation network 844, incorporating resistors and capacitors, connected between the error signal COMP and an inverting input of a differential amplifier. In an embodiment, the compensation network 844 is included in a same integrated circuit as the EA 804.

A threshold signal COMP1 is generated from the error signal COMP and the output voltage Vout using the threshold resistor 848. The programmable current source 846 generates a current according to the output voltage Vout and supplies it to a first terminal of the threshold resistor 848, the first terminal being the source of the threshold signal COMM. A second terminal of the threshold resistor 848 is connected to the error signal COMP. Accordingly, a value of the threshold signal COMP1 is equal to a value of the error signal COMP plus the voltage developed across the threshold resistor 848. The voltage developed across the threshold resistor 848 is equal to the current generated by the programmable current source 846 times a resistance $R_{TH}$ of the threshold resistor 848.

The inverter 814 receives the PWM start signal PWM_MLT and inverts it. The common one-shot circuit 816 receives the inverted version of PWM start signal PWM_MLT and generates a pulse on a pulse signal P in response of a rising edge of the inverted version of PWM start signal PWM_MLT. The inverter 814 and the common one-shot circuit 816 operate to produce a pulse in response to a falling edge of a pulse on the PWM start signal PWM_MLT.

The phase sequencer circuit 818 receives the pulse signal P, and in an embodiment also receives the number of phases signal N. The phase sequencer circuit 818 generates first to $n^{th}$ phase select signals D1 to Dn according to the pulse signal P and the value of the number of phases signal N.

In an initial state, the phase sequencer circuit 818 sets the first phase select signal D1 to an active state (e.g. a high state) and sets the second to $n^{th}$ phase select signal D2 to Dn to an inactive (e.g. low) state, indicating that the first phase is a selected phase.

Subsequently, when an $i^{th}$ phase select signal D(i) has the active state, i is less than the value of the number of phases signal N, and a pulse is received on the pulse signal P, the phase sequencer circuit 818 sets the $i^{th}$ phase select signal D(i) to the inactive state and sets the $(i+1)^{th}$ phase select signal D(i+1) to the active state. When an $i^{th}$ phase select signal D(i) has the active state, i is equal to or greater than the value of the number of phases signal N, and a pulse is received on the pulse signal P, the phase sequencer circuit 818 sets the $i^{th}$ phase select signal D(i) to the inactive state and the first phase select signal D1 to the active state.

Accordingly, the phase sequencer circuit 818 sets only one of the first to $n^{th}$ phase select signals D1 to Dn to the active state (i.e., as the active phase) at any time. The phase sequencer circuit 818 steps through the first to $n^{th}$ phase select signals D1 to Dn (when n=N), setting each to the active state (i.e., as the active phase) in turn, as pulses are received on the pulse signal P.

In an embodiment, the phase sequencer circuit 818 comprises a circular shift register having first to $n^{th}$ bits corresponding to the first to $n^{th}$ phase select signals D1 to Dn. The circular shift register is initialized to having a one (corresponding to the active state) in the first bit and zeroes (corresponding to the inactive state) in all the second to $n^{th}$ bits, and the values in the bits are rotated each time a pulse is received on the pulse signal P.

The first to $n^{th}$ one-shot circuits 820-1 to 820-*n* receive the first to $n^{th}$ PWM signals PWM1 to PWMn, respectively. The first to $n^{th}$ one-shot circuits 820-1 to 820-*n* generate a pulse on output signals thereof in response to positive edges of the first to $n^{th}$ PWM signals PWM1 to PWMn, respectively. In an embodiment, the pulse has a high value (such as a logical 1).

The OR gate 822 receives the output signals of the first to $n^{th}$ one-shot circuits 820-1 to 820-*n* and generates a PWM start signal PWM_MLT having a value equal to a logical or of the values of the outputs of the first to $n^{th}$ one-shot circuits 820-1 to 820-*n*. As a result, whenever any of the first to $n^{th}$ one-shot circuits 820-1 to 820-*n* generates a pulse having a high value on its output signal, the OR gate 822 generates a pulse having a high value on the PWM start signal PWM_MLT.

The CSR signal generator 824 receives first to $n^{th}$ current sense (CS) signals CS1 to CSn, first to $n^{th}$ PWM signals PWM1 to PWMn, and an input voltage Vin. In embodiments, the CSR signal generator 824 may receive other signals, such as low drive signals, switched node signals, or both, as described below. The CSR signal generator 824 generates first to $n^{th}$ CSR signals CSRAMP1 to CSRAMPn according to the received signals.

In an embodiment, the CSR signal generator 824 generates the first CSR signal CSRAMP1 according to the first CS signal CS1, the first PWM signal PWM1 or a first switched node signal SW1, and the input voltage Vin; generates the second CSR signal CSRAMP2 according to the second CS signal CS2, the second PWM signal PWM2, and the input voltage Vin; and generates the $n^{th}$ CSR signal CSRAMPn according to the $n^{th}$ CS signal CSn, the $n^{th}$ PWM signal PWMn, and the input voltage Vin. Each of the first to $n^{th}$ CSR signals CSRAMP1 to CSRAMPn is generated independently of others of the first to $n^{th}$ CSR signals CSRAMP1 to CSRAMPn.

Further details of the operation of embodiments of the CSR signal generator 824 are described below with respect to FIGS. 9A, 9B, 10A, and 10B.

The summing circuit 810 receives the first to $n^{th}$ CSR signals CSRAMP1 to CSRAMPn and sums the received signals. The sum generated by the summing circuit 810 is then divided by a factor of N by a scaling circuit 812 to produce a combined CSR signal CSRAMP0.

The error comparator 808 receives the combined CSR signal CSRAMP0 and the error signal COMP and generates a phase set signal PWMS. The error comparator 808 generates the phase set signal PWMS having a high value (i.e. a value corresponding to logically true) when the error signal COMP is greater than the combined CSR signal CSRAMP0. The error comparator 808 generates the phase set signal PWMS having a low value (i.e. a value corresponding to logically false) when the error signal COMP is less than the combined CSR signal CSRAMP0.

In an embodiment, the error comparator 808 has a predetermined amount of hysteresis to prevent spurious oscillation on the phase set signal PWMS.

The first PWM control circuit 830-1 receives the threshold signal COMP1, the first CSR signal CSRAMP1, the phase set signal PWMS, and the first phase select signal D1. The first PWM control circuit 830-1 generates a first PWM signal PWM1 by setting the first PWM signal PWM1 to a high state when the phase set signal PWMS has a high value and the first phase select signal D1 has the active state, and by resetting the first PWM signal PWM1 to a low value when a value of the threshold signal COMP1 is less than a value of the first CSR signal CSRAMP1.

In an embodiment, the first PWM control circuit 830-1 includes a first AND gate 832-1, a first comparator 834-1, and a first set-reset latch 836-1. An output of the first AND 832-1 gate is connected to a set input of the first set-reset latch 836-1, and an output of the first comparator 834-1 is connected to a reset input of the first set-reset latch 836-1. The first PWM signal PWM1 is an output of the first set-reset latch 836-1.

A first input of the first AND gate 832-1 receives the phase set signal PWMS, and a second input of the first AND gate 832-1 receives the first phase select signal D1. When the phase set signal PWMS and first phase select signal D1 are both high, the output of the first AND gate 832-1 goes high, causing the output of the first set-reset latch 836-1 to be set.

A positive input of the first comparator 834-1 receives the first CSR signal CSRAMP1 and a negative input of the first comparator 834-1 receives the threshold signal COMM. When the first CSR signal CSRAMP1 is greater than the threshold signal COMP1, the output of the first comparator 834-1 goes high, causing the output of the first set-reset latch 836-1 to be reset.

In other words, when the first phase is the selected phase and the phase set signal PWMS is high, the first PWM signal PWM1 is asserted, placing the first phase in a charging state wherein current is supplied to the inductor of the first phase and to a load. When the first CSR signal CSRAMP1 is greater than the threshold signal COMP1, the first PWM signal PWM1 is de-asserted (regardless of whether the first phase is the selected phases), taking the first phase out of the charging state and placing it in a discharge state wherein energy is discharged from the inductor of the first phase into the load.

The second PWM control circuit 830-2 receives the threshold signal COMP1, the second CSR signal CSRAMP2, the phase set signal PWMS, and the second phase select signal D2. The second PWM control circuit 830-2 generates a second PWM signal PWM2 by setting the second PWM signal PWM2 to a high state when the phase set signal PWMS has a high value and the second phase select signal D2 has the active state, and by resetting the second PWM signal PWM2 to a low value when a value of the threshold signal COMP1 is less than a value of the second CSR signal CSRAMP2.

In an embodiment, the second PWM control circuit 830-2 includes a second AND gate 832-2, a second comparator 834-2, and a second set-reset latch 836-2, which are connected as described for the first PWM control circuit 830-1. The second PWM control circuit 830-2 operates in a manner similar to that described for the first PWM control circuit 830-1.

The $n^{th}$ PWM control circuit 830-$n$ receives the threshold signal COMP1, the $n^{th}$ CSR signal CSRAMPn, the phase set signal PWMS, and the $n^{th}$ phase select signal Dn. The $n^{th}$ PWM control circuit 830-$n$ generates a $n^{th}$ PWM signal PWMn by setting the $n^{th}$ PWM signal PWMn to a high state when the phase set signal PWMS has a high value and the $n^{th}$ phase select signal Dn has the active state, and by resetting the $n^{th}$ PWM signal PWMn to a low value when a value of the threshold signal COMP1 is less than a value of the $n^{th}$ CSR signal CSRAMPn.

In an embodiment, the $n^{th}$ PWM control circuit 830-$n$ includes an $n^{th}$ AND gate 832-$n$, an $n^{th}$ comparator 834-$n$, and an $n^{th}$ set-reset latch 836-$n$, which are connected as described for the first PWM control circuit 830-1. The $n^{th}$ PWM control circuit 830-$n$ operates in a manner similar to that described for the first PWM control circuit 830-1.

Each of the first to $n^{th}$ PWM control circuits 830-1 to 830-$n$ operates independently of the other of the first to $n^{th}$ PWM control circuits 830-1 to 830-$n$. Each can initiate the charging state of the respective phase when selected as the active phase by the respective phase select signal, according to the value of the phase set signal PWMS. Each can end the charging state and begin the discharge state of the respective phase at any time, according to the values of threshold signal COMP1 and the respective CSR signal. As a result, any number of phases (including zero) can be in the charging state at any given time, and any number of phases (including zero) can be in the discharging state at any given time.

FIG. 9A illustrates a CSR signal generator 924 according to an embodiment. The CSR signal generator 924 is suitable for use in the CSR signal generator 824 of FIG. 8. The CSR signal generator 924 includes first to $n^{th}$ CSR generator circuits 902-1 to 902-n.

The CSR signal generator 924 receives a supply voltage Vcc and supplies it to the first to $n^{th}$ CSR generator circuits 902-1 to 902-n. The CSR signal generator 924 either receives or internally generates a DC offset voltage Vos and supplies it to the first to $n^{th}$ CSR generator circuits 902-1 to 902-n. The CSR signal generator 924 receives first to $n^{th}$ CS signals CS1 to CSn and supplies them to the first to $n^{th}$ CSR generator circuits 902-1 to 902-n, respectively.

In an embodiment, the CSR signal generator 924 receives first to $n^{th}$ PWM signals PWM1 to PWMn and provides them to the first to $n^{th}$ CSR generator circuits 902-1 to 902-n, respectively. In an embodiment, the first to $n^{th}$ PWM signals PWM1 to PWMn are the first to $n^{th}$ PWM signals PWM1 to PWMn of FIG. 8.

In another embodiment, the CSR signal generator 924 receives first to $n^{th}$ switched node signals SW1 to SWn and provides them to the first to $n^{th}$ CSR generator circuits 902-1 to 902-n, respectively. In an embodiment, the first to $n^{th}$ switched node signals SW1 to SWn are the first to $n^{th}$ switched node signals SW1 to SWn of FIG. 7.

In another embodiment, the CSR signal generator 924 receives an input voltage Vin and provides it to the first to $n^{th}$ CSR generator circuits 902-1 to 902-n. In an embodiment, the input voltage Vin is the input voltage Vin of FIG. 7.

The first to $n^{th}$ CSR generator circuits 902-1 to 902-n respectively generate first to $n^{th}$ CSR signals CSRAMP1 to CSRAMPn in the manner described for the CSR generator circuit 902-k of FIG. 9B, described below.

FIG. 9B illustrates a CSR generator circuit 902-k according to an embodiment. The CSR generator circuit 902-k is suitable for use in any or all of the first to $n^{th}$ CSR generator circuits 902-1 to 902-n of FIG. 9A.

The CSR generator circuit 902-k receives a supply voltage Vcc, an offset voltage Vos, a current reference signal iRef, a phase control signal PCTL, and a current sense (CS) signal CSk. The CS signal CSk is a current sense signal of a $k^{th}$ phase.

In an embodiment, the CS signal CSk is obtained by inductor current sensing. In another embodiment, the CS signal CSk is obtained by MOSFET current sensing.

In an embodiment, the current reference signal iRef is the input voltage Vin.

In another embodiment, the current reference signal iRef is the a $k^{th}$ phase switched node signal SWk, in order to provide good adaptive pulse width control of a $k^{th}$ phase PWM signal.

In an embodiment, the phase control signal PCTL is a $k^{th}$ phase PWM signal PWMk.

In another embodiment, the phase control signal PCTL is the $k^{th}$ phase switched node signal SWk. In an embodiment, both the phase control signal PCTL and the current reference signal iRef are the $k^{th}$ phase switched node signal SWk.

The CSR generator circuit 902-k produces a CSR signal CSRAMPk according to the signals received the CSR generator circuit 902-k. In an embodiment, the CSR signal CSRAMPk is a $k^{th}$ phase CSR signal.

When the phase control signal PCTL has a low value, the CSR generator circuit 902-k produces the CSR signal CSRAMPk having a value equal to a sum of a value of the offset voltage Vos and a voltage proportional to a value of the CS signal CSk. When the phase control signal PCTL has a high value, the CSR generator circuit 902-k increases the value of the CSR signal CSRAMPk at a rate proportional to a value of the current reference signal iRef.

The CSR generator circuit 902-k includes a current source 904, a first transistor 906, an inverter 908, an amplifier 910, a summing circuit 912, a second transistor 914, and a capacitor 918. In some embodiments, the CSR generator circuit 902-k further includes a first resistor 916, a second resistor 920, or both.

The current source 904 provides, at an output, a charging current $i_{CH}$ proportional to the value of the current reference signal iRef. In an embodiment, the current source 904 provides the charging current $i_{CH}$ proportional to a product of the value of the current reference signal iRef and a switching frequency $f_{SW}$:

$$i_{CH} = Gin \times iRef = k \times f_{SW} \times iRef, \qquad \text{Equation 2}$$

where Gin is a transconductance gain of the current source 904 and k is a constant. In an embodiment, the switching frequency $f_{SW}$ is a target nominal frequency.

The first transistor 906 is coupled between the output of the current source 904 and a first terminal of the capacitor 918 and receives the phase control signal PCTL at a control terminal (such as a gate). The first transistor 906 provides the charging current $i_{CH}$ to the first terminal of the capacitor 918 when the phase control signal PCTL has the high value, and prevents the charging current $i_{CH}$ from being provided to the first terminal of the capacitor 918 when the phase control signal PCTL has the low value. In an embodiment, the first transistor 906 includes a FET, such as an n-channel MOSFET.

The inverter 908 outputs a high value when the phase control signal PCTL has the low value, and outputs a low value when the phase control signal PCTL has the high value.

The amplifier 910 generates an amplified current sense signal ACS proportional to a value of the CS signal CSk. In an embodiment, a value of the amplified current sense signal ACS is determined according to:

$$ACS = G_{CS} \times CS_k \qquad \text{Equation 3}$$

where $G_{CS}$ is a gain of the amplifier 910.

The summing circuit 912 receives the amplified current sense signal ACS and the offset voltage Vos. The summing circuit 912 generates, at an output, an offset current sense signal OCS that is equal to the value of the amplified current sense signal ACS plus a value of the offset voltage Vos.

The second transistor 914 is coupled between the output of the summing circuit 912 and the first terminal of the capacitor 918. A control terminal of the second transistor 914 (such as a gate) receives the output of the inverter 908. The second transistor 914 provides the offset current sense signal OCS to the first terminal of the capacitor 918 when the phase control signal PCTL has the low value, and prevents the offset current sense signal OCS being supplied to the first terminal of the capacitor 918 when the phase control signal PCTL has the high value.

In an embodiment, the first resistor 916 is coupled between the second transistor 914 and the first terminal of the capacitor 918. The first resistor 916 acts as a low-pass filter resistor. In an embodiment, a time constant equal to a product of a resistance of the first resistor 916 and a capacitance of the capacitor 918 is much smaller than a period of a nominal switching frequency of a switched power supply incorporating the CSR generator circuit 902-k, such as a period of the switching frequency $f_{SW}$.

A second terminal of the capacitor 918 is coupled to the offset voltage Vos.

In an embodiment, the second resister 920 is coupled between the first and second terminals of the capacitor 918. The second resister 920 provides a bias voltage for the CSR signal CSRAMPk, especially when a pulse skipping operation is enabled.

In an embodiment, a resistance of the second resistor 920 is much higher resistance than the resistance of the first resistor 916. For example, the resistance of the second resistor 920 may be a hundred times or more the resistance of the first resistor 916.

Figure 10A:
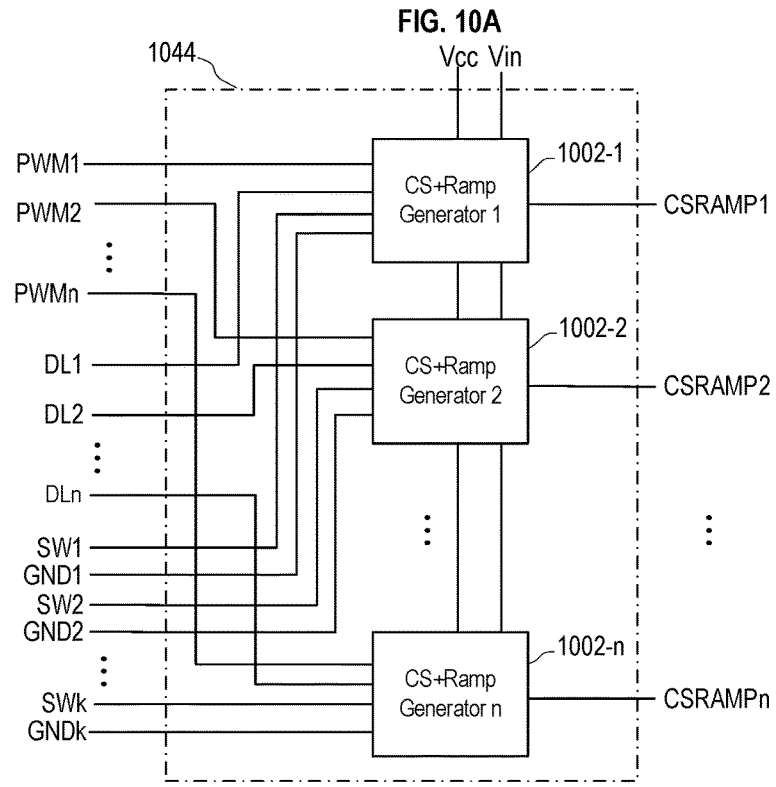
FIG. 10A illustrates a multi-phase CSR generator circuit according to another embodiment.

FIG. 10A illustrates a CSR signal generator 1044 according to another embodiment. The CSR signal generator 1044 is suitable for use in the CSR signal generator 844 of FIG. 8 when the first to $n^{th}$ low side drive signals DL1 to DLn shown in FIG. 7 are also provided to the CSR signal generator 844. The CSR signal generator 1044 includes first to $n^{th}$ CSR generator circuits 1002-1 to 1002-n.

The CSR signal generator 1044 receives a supply voltage Vcc and supplies it to the first to $n^{th}$ CSR generator circuits 1002-1 to 1002-n. In an embodiment, the CSR signal generator 1044 also receives an input voltage Vin and supplies it to the first to $n^{th}$ CSR generator circuits 1002-1 to 1002-n.

The CSR signal generator 1044 receives first to $n^{th}$ positive current sense signals GND1 to GNDn and supplies them to the first to $n^{th}$ CSR generator circuits 1002-1 to 1002-n, respectively. The CSR signal generator 1044 also receives first to $n^{th}$ switched node signals SW1 to SWn and supplies them to the first to $n^{th}$ CSR generator circuits 1002-1 to 1002-n, respectively.

The CSR signal generator 1044 also receives the first to $n^{th}$ low side drive signals DL1 to DLn and supplies them to the first to $n^{th}$ CSR generator circuits 1002-1 to 1002-n, respectively. The first to $n^{th}$ low side drive signals DL1 to DLn may be the first to $n^{th}$ low side drive signals DL1 to DLn of the circuit shown in FIG. 7.

In an embodiment, the CSR signal generator 1044 receives first to $n^{th}$ PWM signals PWM1 to PWMn and provides them to the first to $n^{th}$ CSR generator circuits 1002-1 to 1002-n, respectively.

In another embodiment, the CSR signal generator 1044 receives first to $n^{th}$ switched node signal SW1 to SWn and provides them to the first to $n^{th}$ CSR generator circuits 1002-1 to 1002-n, respectively.

Figure 10B:
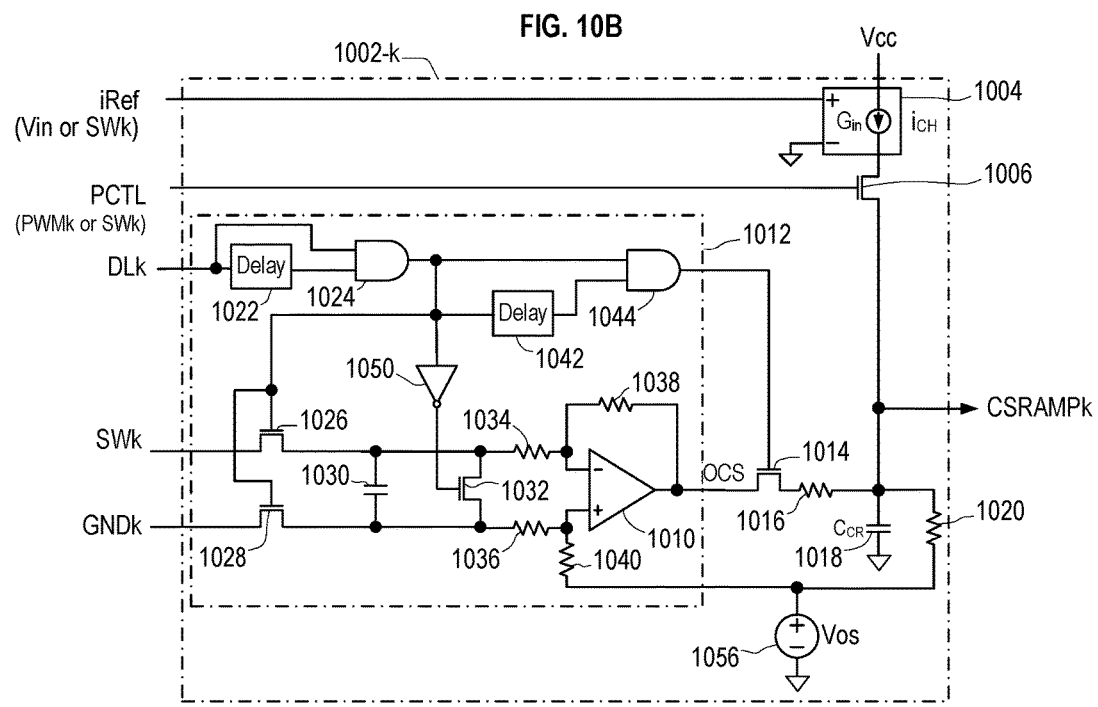
FIG. 10B illustrates a CSR generator circuit according to an embodiment.

The first to $n^{th}$ CSR generator circuits 1002-1 to 1002-n respectively generate first to $n^{th}$ CSR signals CSRAMP1 to CSRAMPn in the manner described for the CSR generator circuit 1002-k of FIG. 10B.

FIG. 10B illustrates a CSR generator circuit 1002-k according to an embodiment. The CSR generator circuit 1002-k is suitable for use in any or all of the first to $n^{th}$ CSR generator circuits 1002-1 to 1002-n of FIG. 10A.

The CSR generator circuit 1002-k receives an input voltage Vin, an offset voltage Vos, a current reference signal iRef, a phase control signal PCTL, a positive current sense signal GNDk, a $k^{th}$ phase switched node signal SWk which may operates as a negative current sense signal, and a low side drive signals DLk. The signals GNDk and SWk operate as differential current sense signals of a $k^{th}$ phase, and the low side drive signals DLk is a low side drive signal of a $k^{th}$ phase.

In an embodiment, the current reference signal iRef is the input voltage Vin.

In an embodiment, the current reference signal iRef is the a $k^{th}$ phase switched node signal SWk, in order to provide good adaptive pulse width control of a $k^{th}$ phase PWM signal.

In an embodiment, the phase control signal PCTL is a $k^{th}$ phase PWM signal PWMk.

In an embodiment, the phase control signal PCTL is the $k^{th}$ phase switched node signal SWk.

The CSR generator circuit 1002-k produces a CSR signal CSRAMPk according to the received signals. In an embodiment, the CSR signal CSRAMPk is a $k^{th}$ phase CSR signal.

When the phase control signal PCTL has a low value, the CSR generator circuit 1002-k produces the CSR signal CSRAMPk having a value equal to a sum of a value of the offset voltage Vos and a voltage proportional to a difference between the positive current sense signal GNDk and $k^{th}$ phase switched node signal SWk. When the phase control signal PCTL has a low value, CSR generator circuit 902-k increases the value of the CSR signal CSRAMPk at a rate proportional to a value of the current reference signal iRef.

The CSR generator circuit 1002-k includes a current source 1004, a first transistor 1006, an Offset Current Sense (OCS) circuit 1012, a second transistor 1014, an output capacitor 1018, and an offset voltage generator 1056. In some embodiments, the CSR generator circuit 1002-k further includes a first resistor 1016, a second resistor 1020, or both.

The current source 1004, first transistor 1006, second transistor 1014, output capacitor 1018, first resistor 1016 (if present), and second resistor 1020 (if present) are configured and operate analogously to the current source 904, first transistor 906, second transistor 914, output capacitor 918, first resistor 916, and second resistor 920 of FIG. 9B, respectively. The offset voltage generator 1056 provides the offset voltage Vos that was supplied from an external source to the CSR generator circuit 902-k of FIG. 9B.

The OCS circuit 1012 generates an offset plus CS signal OCS corresponding to a differential value of the positive current sense signal GNDk and $k^{th}$ phase switched node signal SWk summed with a value of the offset voltage Vos. The OCS circuit 1012 includes an amplifier 1010, first and second sampling transistors 1026 and 1028, a sampling reset switch 1032, a sampling capacitor 1030, and third to sixth resistors 1034 to 1040.

The OCS circuit 1012 differs from the OCS circuit 912 of FIG. 9B in that the control signal chain of OCS circuit 1012 operates using the low side drive signal DLk. The control signal chain of OCS circuit 1012 includes first and second delay circuits 1022 and 1042, and first and second AND gates 1024 and 1044.

The low side drive signal DLk is connected to a first input of the first AND gate 1024 and to an input of the first delay circuit 1022. The first delay circuit 1022 provides, to a second input of the first AND gate 1024, an output signal corresponding to a delayed version of the low side drive signal DLk.

An output of the first AND gate 1024 therefore produces an output signal that goes low as an immediate response to the low side drive signal DLk going low, and that goes high as a delayed response to the low side drive signal DLk going high. The delay in the output of the first AND gate 1024 going high corresponds to a delay of the first delay circuit 1022.

The output of the first AND gate 1024 is connected to a first input of the second AND gate 1044 and to an input of the second delay circuit 1042. The second delay circuit 1042 provides, to a second input of the second AND gate 1044, an output signal corresponding to a delayed version of the output of the first AND gate 1024.

An output of the second AND gate 1044 therefore produces an output signal that goes low as an immediate response to the output of the first AND gate 1024 going low, and that goes high as a delayed response to the output of the first AND gate 1024 going high. The delay in the output of the second AND gate 1044 going high corresponds to a delay of the second delay circuit 1042.

The first AND gate 1024 provides an output corresponding to a delayed version of the low side drive signal DLk to the first and second sampling transistors 1026 and 1028, to the inverter 1050, and to the second delay circuit 1042.

The inverter 1050 and the reset switch 1032 operate to reset a voltage difference across the sampling capacitor 1030 to zero when the output of the first AND gate 1024 is low, that is, during periods when the low side drive signal DLk is turned off.

Other than the difference described above between the OCS circuit 1012 and the OCS circuit 912 of FIG. 9B, the configuration and operation of the OCS circuit 1012 is analogous to that of the OCS circuit 912 of FIG. 9B, with components of the OCS circuit 1012 corresponding to similarly-numbered components in FIG. 9B.

The embodiment of the controller 802 shown in FIG. 8 can be used in applications having a small phase number and low conversion ratio of Vo/Vin. For applications having a large phase number and a wide conversion ratio range, an alternative embodiment shown in FIG. 11 may be appropriate or preferred.

Figure 11:
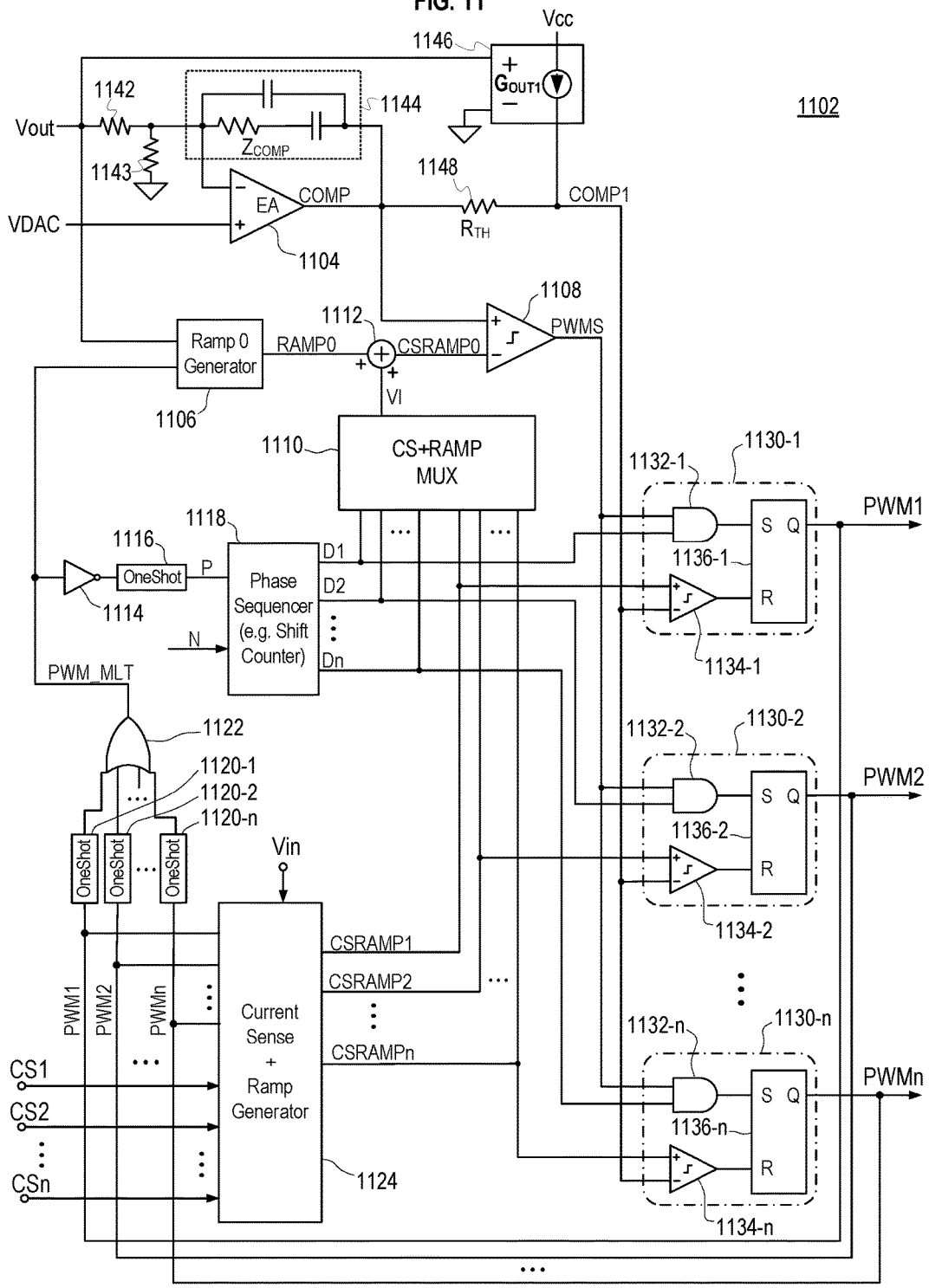
FIG. 11 illustrates a multi-phase PWM controller circuit according to another embodiment.

FIG. 11 illustrates a multi-phase PWM controller circuit 1102 (hereinafter controller 1102) according to another embodiment. The controller 1102 differs from the controller 802 in how the combined CSR signal CSRAMP0 is generated. Except as noted below, elements of FIG. 11 having reference characters of the form "11XX" correspond to elements of FIG. 8 having reference characters of the form "8XX" and may be are substantially identical in configuration and function. For example, the phase sequencer circuit 1118 of FIG. 11 is substantially identical to the phase sequencer circuit 818 of FIG. 8, and so on.

Instead of using an averaged signal like the controller 802 of FIG. 8, the combined CSR signal CSRAMP0 in FIG. 11 is created by a sum of a common ramp signal RAMP0 from a ramp0 generator circuit 1106 and a rotating signal VI from an N-to-1 multiplexer circuit 1110. The N-to-1 multiplexer circuit 1110 provides the CSR signal of the selected phase as the rotating signal VI. Accordingly, when an $x^{th}$ phase is the selected by the phase sequencer circuit 1118, the N-to-1 multiplexer circuit 1110 provides the $x^{th}$ CSR signal CSRAMPx as the rotating signal VI.

Figure 12:
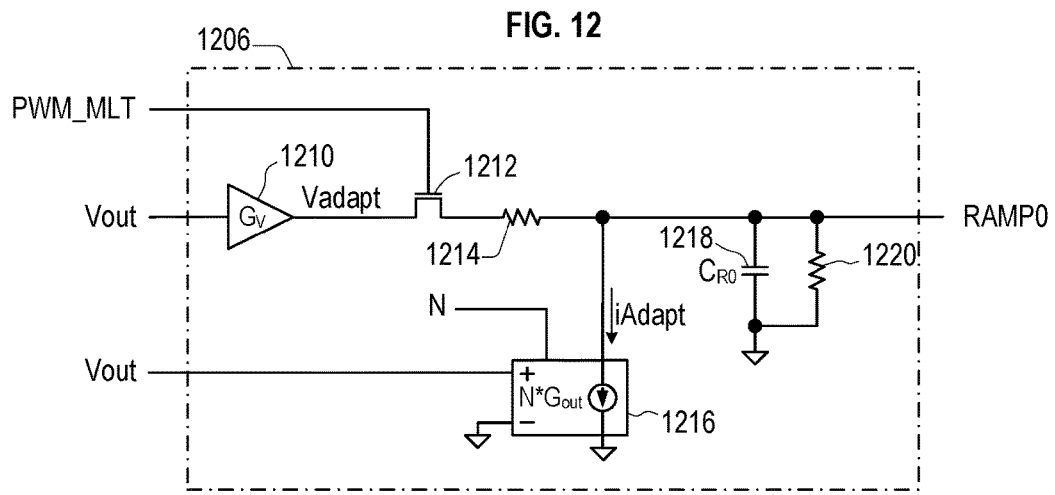
FIG. 12 illustrates a ramp generator circuit according to an embodiment.

FIG. 12 illustrates a ramp generator circuit 1206 suitable for use as the ramp0 generator circuit 1106 of FIG. 11, according to an embodiment. In the ramp generator circuit 1206, a capacitor 1218 is connected using a switch 1212 to an adaptive voltage Vadapt when the pulse signal PWM_MLT is high. The adaptive voltage Vadapt may be generated using an amplifier 1210 and be proportional to an output voltage Vout supplied to the amplifier 1210.

An adaptive current iAdapt discharges the capacitor 1218. The adaptive current iAdapt is generated by a programmable current source 1216 and is proportional to a phase number N and the output voltage Vout. In an embodiment wherein the CSR signal generator 924 of FIG. 9A is used to provide the CSR signal generator 1124 of FIG. 11, the transconductance gain Gout of the programmable current source 1216 is equal to or close to the transconductance gain Gin in the CSR generator 902-k shown in FIG. 9B, and a capacitance of the capacitor 1218 is equal to a capacitance of the capacitor 918. For a reference, iAdapt=N*Gout*Vout=N*k*$f_{SW}$*Vout. In an embodiment, a voltage gain Gv of the amplifier 1210 is Gv=k/$C_{RO}$, wherein $C_{RO}$ is a capacitance of the capacitor 1218, and consequently it takes a time of $T_{SW}$/N=1/(N*$F_{SW}$) for the combined CSR signal RAMP0 to discharged from a voltage level of Gv*Vout to zero.

Figure 13:
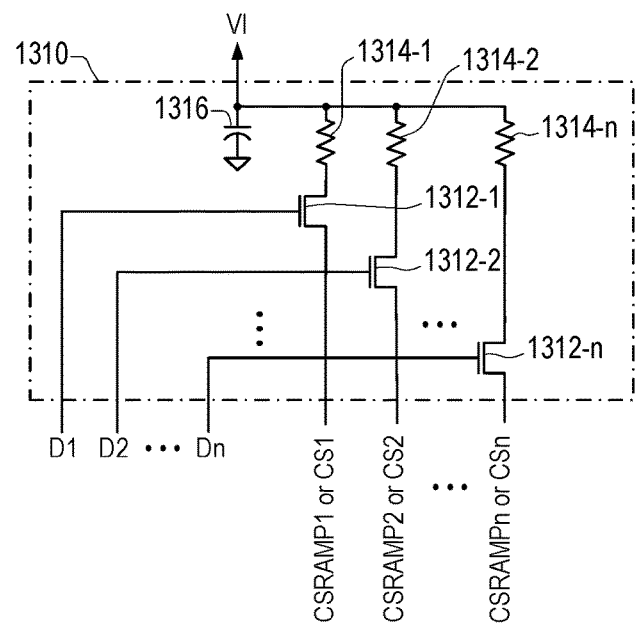
FIG. 13 illustrates a multiplexer circuit according to an embodiment.

FIG. 13 illustrates a multiplexer circuit 1310 according to an embodiment. The multiplexer circuit 1310 is suitable for use as the multiplexer circuit 1110 of FIG. 11.

The multiplexer circuit 1310 receives first to $n^{th}$ phase select signals D1 to Dn and first to $n^{th}$ CSR signals CSRAMP1 to CSRAMPn. The CSR multiplexer circuit 1310 produces a multiplexer output signal VI (the rotating signal VI of FIG. 11) by selecting one of the first to $n^{th}$CSR signals CSRAMP1 to CSRAMPn according to values of the first to $n^{th}$ phase select signals D1 to Dn.

The CSR multiplexer circuit 1310 includes first to $n^{th}$ transistors 1312-1 to 1312-n. In an embodiment, the first to $n^{th}$ transistors 1312-1 to 1312-n include respective n-channel MOSFETs.

Control terminals (e.g., gates) of the first to $n^{th}$ transistors 1312-1 to 1312-n are respectively coupled to the first to $n^{th}$ phase select signals D1 to Dn. First conduction terminals of the first to $n^{th}$ transistors 1312-1 to 1312-n are respectively coupled to the first to $n^{th}$ CSR signals CSRAMP1 to CSRAMPn. Second conduction terminals of the first to $n^{th}$ transistors 1312-1 to 1312-n are coupled to the multiplexer output signal VI.

The first to $n^{th}$ transistors 1312-1 to 1312-n conduct when the respective first to $n^{th}$ phase select signals D1 to Dn has an active (e.g. a high) value, electrically coupling the respective first to $n^{th}$ CSR signals CSRAMP1 to CSRAMPn to the multiplexer output signal VI.

In an embodiment, the CSR multiplexer circuit 1310 further includes first to $n^{th}$ resistors 1314-1 to 1314-n and a capacitor 1316. The first to $n^{th}$ resistors 1314-1 to 1314-n and the capacitor 1316 operate as a low pass filter to attenuate rapid changes in the value of the multiplexer output signal VI caused by, for example, switching of the first to $n^{th}$ transistors 1312-1 to 1312-n.

The first to $n^{th}$ resistors 1314-1 to 1314-n are respectively coupled between the second conduction terminals of the first to $n^{th}$ transistors 1312-1 to 1312-n and the multiplexer output signal VI. A first terminal of the capacitor 1316 is coupled to the multiplexer output signal VI. A second terminal of the capacitor 1316 is coupled to ground. In an embodiment, the first to $n^{th}$ resistors 1314-1 to 1314-n each have a resistance of 1 k Ohm, and the capacitor 1316 has a capacitance of 1 pF.

In general, the embodiments shown in FIGS. 8 and 11 are suitable for a multiphase converter having a centralized PWM controller plus multiple power stages. In embodiments, the proposed PWM control concept can also be extended to another kind of multiphase systems having distributed PWM controllers.

Figure 14:
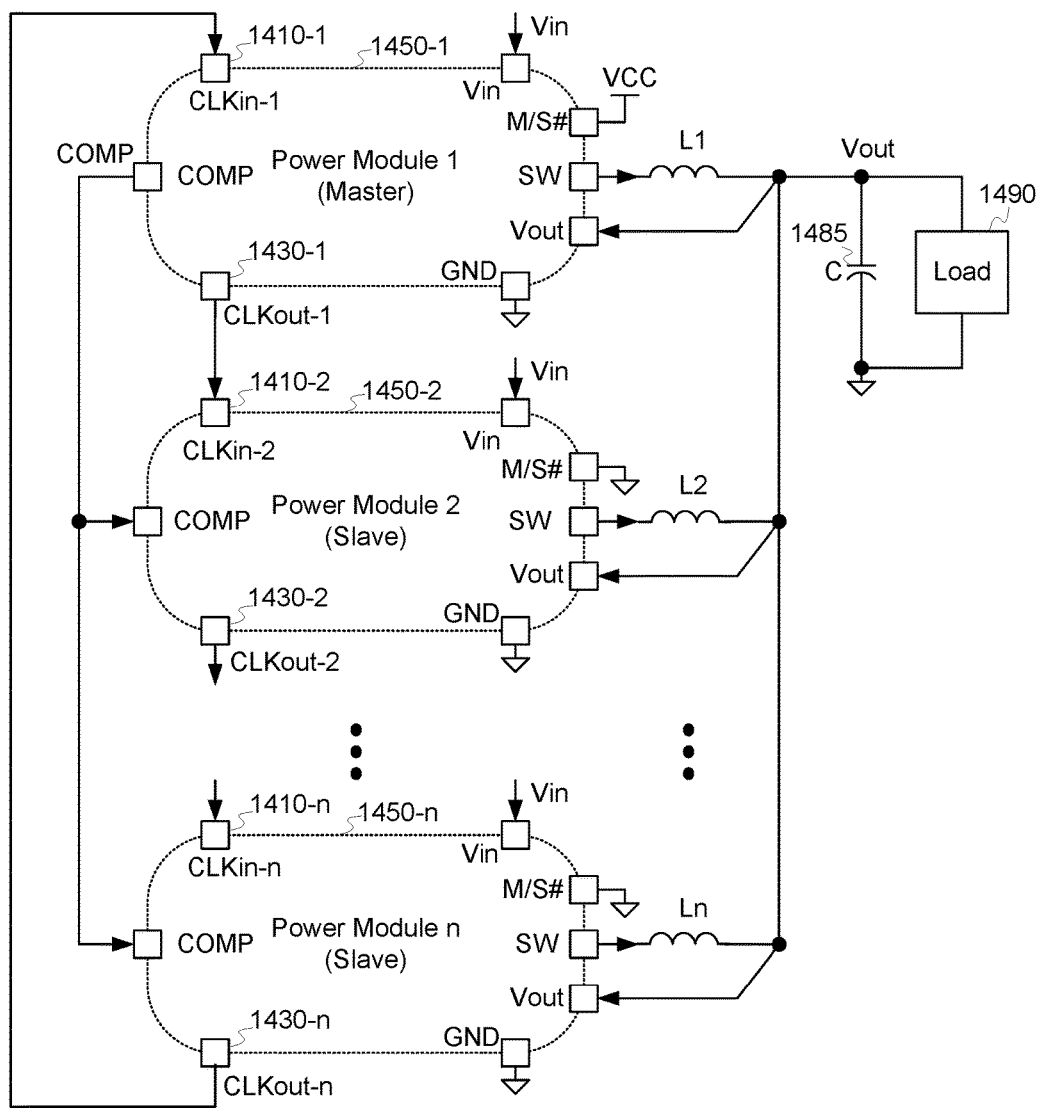
FIG. 14 illustrates a modular multi-phase PWM power supply circuit according to an embodiment.

FIG. 14 illustrates a modular multi-phase PWM power supply circuit 1400 (hereinafter, multi-phase power supply circuit 1400) according to an embodiment. The multi-phase power supply circuit 1400 has first to $n^{th}$ distributed PWM power modules 1410-1 to 1410-n. Unlike the embodiments shown in FIGS. 8 and 11, there is no centralized PWM controller in the multi-phase power supply circuit 1400.

Each of the plurality of power modules 1450-1 to 1450-n includes a controller to generate a current flowing through a corresponding one of the plurality of inductors L1 to Ln. The plurality of power modules 1450-1 to 1450-n have substantially the same configuration, facilitating a scalable chip configuration of the multiphase switching power supply 1400.

The plurality of power modules 1450-1 to 1450-n are coupled to each other in a daisy chain. For example, an $i^{th}$ power modules 1450-$i$ has an output clock port 1430-$i$ connected to an input clock port 1410-($i$+1) of an ($i$+1)$^{th}$ power module 1450-($i$+1), wherein i denotes a natural number less than a phase number n, and an $n^{th}$ power modules 1450-$n$ has an output clock port 1430-$n$ connected to an input clock port 1410-1 of a first power module 1450-1.

One (e.g., the first power module 1450-1) of the plurality of power modules 1450-1 to 1450-$n$, which functions as a master module, detects an output voltage Vout and generates a comparison signal COMP in response to the output voltage Vout and a reference voltage. The first power module 1450-1 provides the comparison signal COMP to the remaining power modules (e.g., second to nth power modules 1450-2 to 1450-$n$), which respectively function as slave modules.

To switch on distributed power modules one by one, a daisy chained clock loop is configured by connecting the CLKout port of one module to the CLKin port of another module in a sequence. The master (here, the first power module 1450-1) has a responsibility to generate the first PWM pulse and output a CLKout–1 signal to the second power module 1450-2.

After the second power module 1450-2 receives a clock signal from its CLKin port 1410-2, it starts its internal signal Ramp0 and prepares for its PWM pulse generation.

The $i^{th}$ power module 1450-$i$ receives a CLKin signal after the i–1$^{th}$ power module 1450-($i$–1) initiates a PWM pulse and then prepares a PWM pulse in the same manner as the previous i–1$^{th}$ power module 1450-($i$–1). The last power module ($n^{th}$ power module 1450-$n$) of an N-phase system outputs a CLKout signal to the first power module 1450-1 once it initiates a PWM pulse in phase n.

Thus, the plurality of power modules 1450-1 to 1450-$n$ are coupled to each other in a daisy chain. For example, an $i^{th}$ power modules 1450-$i$ has an output clock port 1430-$i$ connected to an input clock port 1410-($i$+1) of an ($i$+1)$^{th}$ power module 1450-($i$+1) when i denotes a natural number less than a phase number n, and an $n^{th}$ power modules 1450-$n$ has an output clock port 1430-$n$ connected to an input clock port 1410-1 of a first power module 1450-1.

For a single-phase application, only one power module is needed and it has to be set as a master with a connection between its CLKin port and CLKout port. The advantage of the multiphase system shown in FIG. 14 is flexibility in building a scalable or stackable multiphase converter using a plurality of a single type of single-phase power module.

Figure 15:
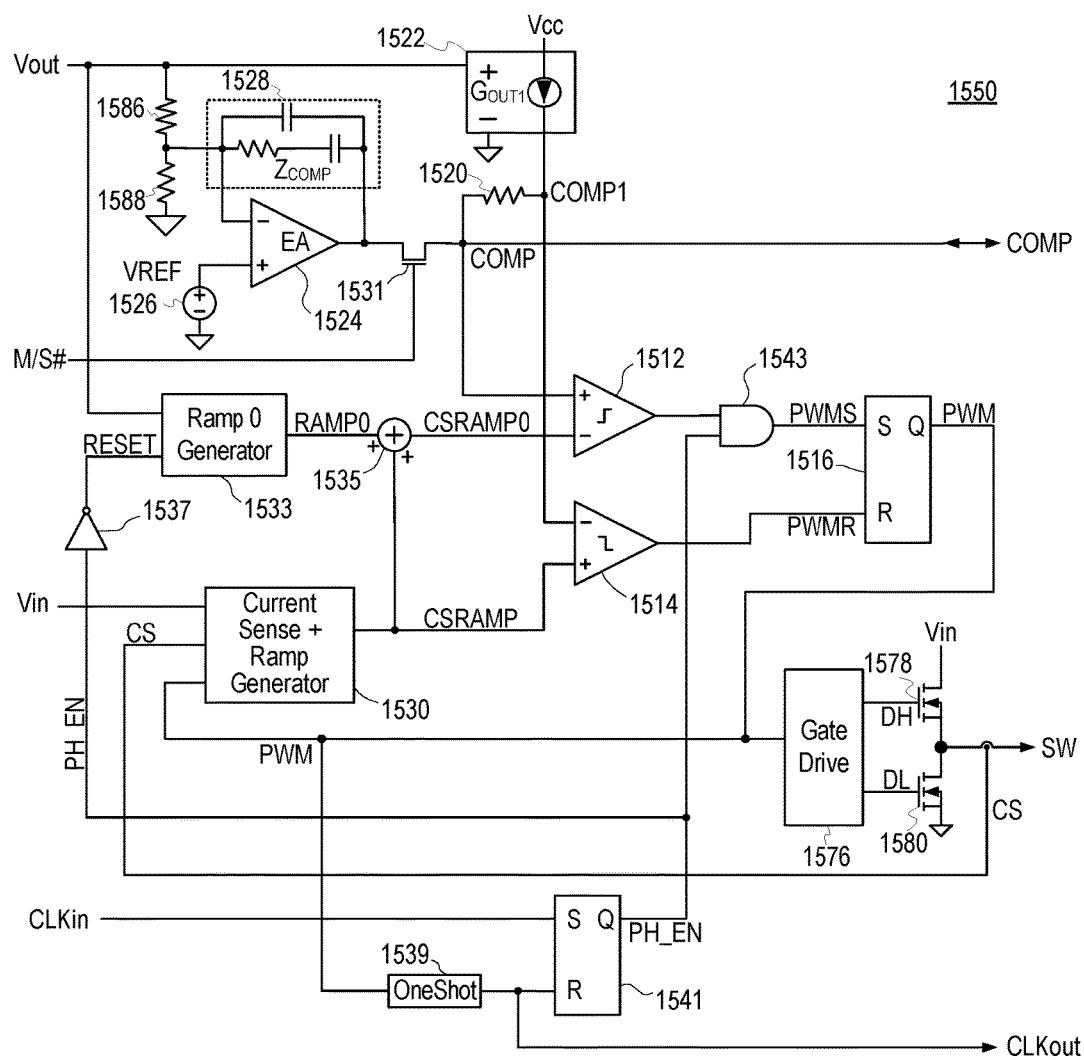
FIG. 15 illustrates a modular controller circuit for use in a modular multi-phase PWM power supply circuit according to an embodiment.

FIG. 15 illustrates an embodiment of a PWM power module 1550 suitable for use as one or more of the plurality of power modules 1450-1 to 1450-$n$ of FIG. 14. The main operation of the circuit in FIG. 15 is similar to the circuit in FIG. 2, but key differences include the daisy-chained phase activation control circuits, the generation of the error signal COMP, and the generation and use of a combined CSR signal CSRAMP0 with an additional Ramp0 generator 1533.

In the PWM power module 1550, elements having reference characters of the form "15XX" correspond to elements of FIG. 2 having reference characters of the form "2XX" and may be are substantially identical in configuration and function. For example, the error amplifier (EA) 1524 of FIG. 15 is substantially identical to the error amplifier 224 of FIG. 2, and so on.

The PWM power module 1550 includes a phase activation control circuit including an inverter 1537, a one-shot circuit 1539, a phase enable flip-flop 1541, and an AND gate 1543. The phase activation control circuit receives a clock in signal CLKin from outside the module and generates a phase enable signal PH_EN and a clock out signal CLKout. The phase enable signal PH_EN controls operations within the PWM power module 1550. The clock out signal CLKout is provided as an output of the PWM power module 1550.

The phase enable set-reset latch 1541 (hereinafter, phase enable latch 1541) is set when the clock in signal CLKin is high, which turns on the phase enable signal PH_EN. When the phase enable signal PH_EN is on, the inverter 1537 turns off a reset signal RESET provided to a ramp0 generator circuit 1533, and the AND gate 1543 allows a PWM latch 1516 to be set when an output of a first comparator 1512 is high.

The phase enable latch 1541 is reset on a rising edge of a PWM signal PWM; that is, the phase enable latch 1541 is reset once a the PWM power module 1550 initiates a PWM pulse using a gate drive circuit 1576. The phase enable flip-flop 1541 is reset by an output of the one-shot circuit 1539, which also provides a positive-going pulse on the clock out signal CLKout in response to the rising edge of a PWM signal PWM. The positive-going pulse on the clock out signal CLKout may be used to set the phase enable signal of another PWM power module that receives the clock out signal CLKout on its clock in signal CLKin. In an embodiment, an initialization circuit sets the phase enable latch 1541 in response to a power-up or initialization signal being asserted when the master signal M/S# is asserted (i.e. has a high level).

When a plurality of the PWM power modules 1550 are daisy-chained together, the phase activation control circuit coordinates the PWM power modules 1550 so that each phase is turned on in a sequence determined by the order in which they are connected. Once turned on, each of the PWM power modules 1550 turns off independent of the operations of the other phases. Accordingly, more than one of the plurality of the PWM power modules 1550 that are daisy-chained together may be on at any given time.

All of the plurality of the PWM power modules 1550 that are daisy-chained together may use a same error signal COMP. In an embodiment, all of the PWM power modules 1550 that are daisy-chained together use the error signal COMP generated by the master PWM power module 1550. As shown in FIG. 14, the master PWM power module 1550 has a high level provided to it on a master signal M/S#, and the other PWM power modules 1550 that are daisy-chained have a low level provided to them on the master signal M/S#.

When the PWM power module 1550 is set as a master by a high level of the master signal M/S#, an EA 1524 of the PWM power module 1550 is hooked up to the system through a master select switch 1531 and provides the error signal COMP for all the PWM power modules 1550 that are daisy-chained together. When the PWM power module 1550 is set as a slave by a low level of the master signal M/S#, of the EA 1524 is disconnected from the system by the master select switch 1531, and an external error signal COMP from a master module is used instead.

Another difference between the controller 200 of FIG. 2 and the PWM power module 1550 is that the generation of the PWM set signal PWMS is based on a comparison of the error signal COMP to a combined CSR signal CSRAMP0 in the PWM power module 1550, as opposed to a comparison of the error signal COMP to a CSR signal CSRAMP in the controller 200. The combined CSR signal CSRAMP0 is generated by a summing circuit 1535 as a sum of the CSR signal CSRAMP and a common ramp signal RAMP0. The common ramp signal RAMP0 is generated as described below with respect to FIG. 16.

With the exceptions noted above, the mechanism of generating a PWM set signal PWMS and a PWM reset signal PWMR are the same as described with respect to FIG. 2.

Figure 16:
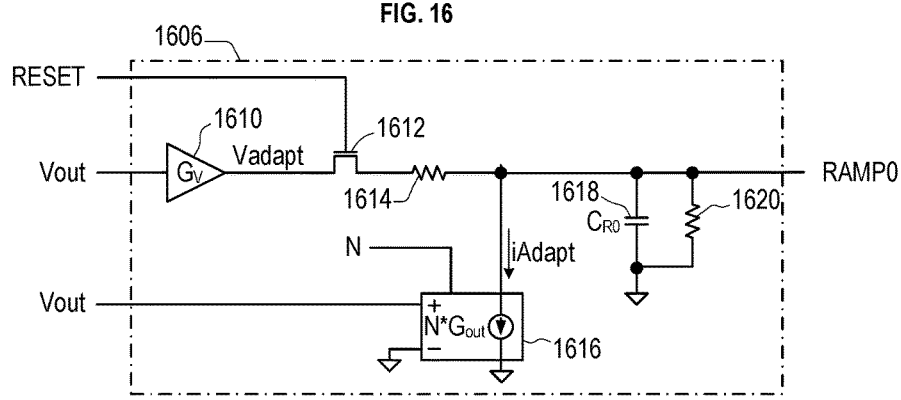
FIG. 16 illustrates a ramp generator circuit according to an embodiment.

FIG. 16 illustrates a ramp generator circuit 1606 according to an embodiment, suitable for use as the ramp0 generator circuit 1533 of FIG. 15. The ramp generator circuit 1606 has identical structure as the RAMP0 generator shown in FIG. 12, but one difference is its reset signal coming from the reset signal RESET shown in FIG. 15.

In the ramp generator circuit 1606, elements having reference characters of the form "16XX" correspond to elements of FIG. 12 having reference characters of the form "12XX" and may be are substantially identical in configuration and function. For example, the amplifier 1610 of FIG. 16 is substantially identical to the amplifier 1210 of FIG. 12, and so on.

Figure 17:
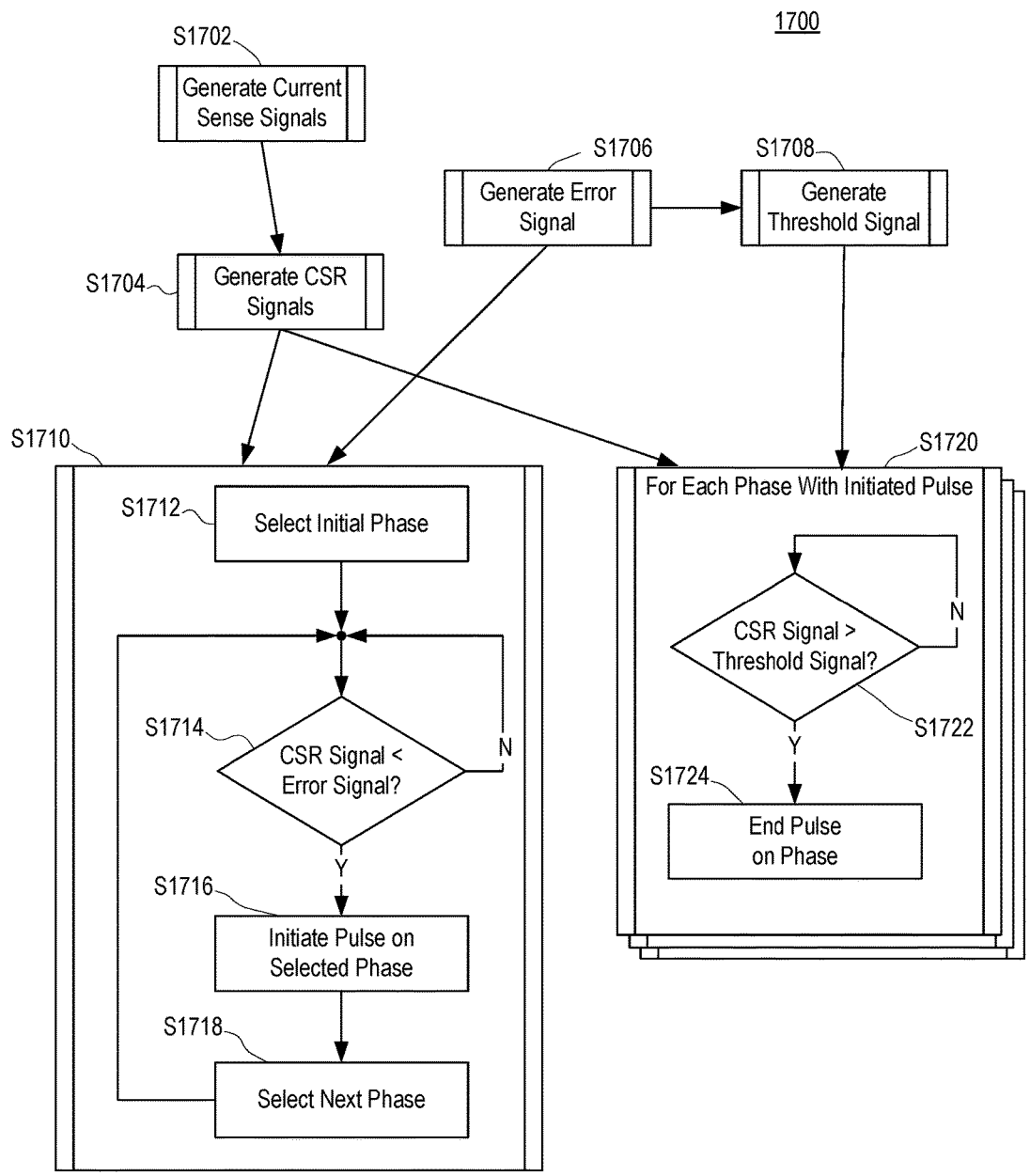
FIG. 17 illustrates a process for controlling a power conversion circuit according to an embodiment.

FIG. 17 illustrates a process 1700 for controlling a power conversion circuit including one or more phases according to an embodiment. Each phase has a respective PWM signal. The power conversion circuit includes an inductor for each phase, each inductor being used for energy storage in a process that converts an input voltage to an output voltage. The process 1700 includes a plurality of subprocesses.

A first subprocess S1702 generates one or more Current Sense (CS) signals respectively corresponding to the one or more phases. Each CS signal has a value corresponding to a current through the inductor of the phase. In embodiment, the current through the inductor of the phase is a current at a time shortly after the end of a pulse on the PWM signal of the phase.

A second subprocess S1704 generates one or more Current Sense and Ramp (CSR) signals respectively corresponding to the one or more phases. Each phase's CSR signal is reset at a time corresponding to the end of a pulse on the phase's PWM signal to a value corresponding to a current through the inductor of the phase. In an embodiment, after each phase's CSR signal is reset, it increases at a rate corresponding to a voltage value of the input voltage when a pulse is present on the phase's PWM signal. In another embodiment, after each phase's CSR signal is reset, it increases at a rate corresponding to a voltage value of a switched terminal of the inductor of the phase when a pulse is present on the phase's PWM signal.

A third subprocess 51706 generates an error signal according to the output voltage and a reference voltage. In an embodiment, the error signal is generated using a difference between the reference voltage and a feedback signal generated from the output voltage using a voltage divider.

A fourth subprocess S1708 generates a threshold signal using the error signal. In an embodiment, a difference between the threshold signal and the error signal corresponds to a voltage value of the output voltage. In another embodiment, a difference between the threshold signal and the error signal corresponds to a low-pass filtered voltage value of a switched terminal of an inductor of a phase.

A fifth subprocess S1710 controls when pulses are initiated on the PWM signals of the one or more phases. The subprocess S1710 includes a plurality of steps.

At a first fifth subprocess step S1712, the fifth subprocess S1710 selects an initial phase to be the selected phase. In an embodiment with only one phase, that phase is the initial phase.

At a second fifth subprocess step S1714, the fifth subprocess S1710 determines whether a CSR signal is less than the error signal. In an embodiment, the CSR signal is the CSR signal of the selected phase. In another embodiment, the CSR signal is an average CSR signal corresponding to an average of all the CSR signals of the one or more phases. When the CSR signal is less than the error signal, at the second fifth subprocess step S1714 the fifth subprocess S1710 proceeds to a third fifth subprocess step S1716; otherwise, at the second fifth subprocess step S1714 the fifth subprocess S1710 loops on the second fifth subprocess step S1714.

At the third fifth subprocess step S1716, the fifth subprocess S1710 initiates a pulse on the PWM signal of the selected phase. The pulse stays present on the PWM signal of that phase until the pulse is ended by one of the sixth subprocesses S1720, as described below.

At a fourth fifth subprocess step S1718, the fifth subprocess S1710 selects a next phase to be the selected phase. In an embodiment with only one phase, that phase is the next phase. In an embodiment, selecting the next phase is performed using a one-hot circular shift register having a bit corresponding to each phase. In an embodiment having N phases numbered 0 to N−1, wherein the selected phase is an $k^{th}$ phase, the next phase is the $((k+1) \bmod N)^{th}$ phase. The fifth subprocess S1710 then proceeds to the second fifth subprocess step S1714.

A sixth subprocess S1720 controls when pulses are ended on the PWM signals of the one or more phases. In an embodiment, one or more instances of the sixth subprocess S1720 are performed, each instance being performed for a respective phase of the one or more phases. In an embodiment, an instance of the sixth subprocess S1720 is performed when a pulse is present on the PWM signal of the corresponding phase. The sixth subprocess S1720 includes a plurality of steps.

At a first sixth subprocess step S1722, the sixth subprocess S1720 compares a CSR signal of the respective phase to the threshold signal. When the CSR signal is greater than the threshold signal, at the first sixth subprocess step S1722 the sixth subprocess S1720 proceeds to a second sixth subprocess step S1724; otherwise, at the first sixth subprocess step S1722 the sixth subprocess S1720 loops on the first sixth subprocess step S1722.

At the second sixth subprocess step S1724, the sixth subprocess S1720 ends the pulse on the PWM signal of the corresponding phase. The sixth subprocess S1720 then stops, and resumes at the first sixth subprocess step S1722 in response to a pulse being initiated on the PWM signal of the corresponding phase.

The PWM power control systems according to embodiments provide accurate output regulation, fast transient response, smooth transitions between DCM and CCM operation, may use an internal compensation circuit with error amplifier(s) thereof, and provide flexibility in scalable multiphase applications.

Embodiments of the present disclosure include electronic devices, e.g., one or more packaged semiconductor devices, configured to perform one or more of the operations described herein. However, embodiments are not limited thereto.

While this invention has been described in connection with what is presently considered to be practical embodiments, embodiments are not limited to the disclosed embodiments, but, on the contrary, may include various modifications and equivalent arrangements included within the spirit and scope of the appended claims. The order of operations described in a process is illustrative and some operations may be re-ordered. Further, two or more embodiments may be combined. The order of operations described in embodiments is illustrative and may be re-ordered unless otherwise constrained. Further, features of two or more embodiments may be combined to form a new embodiment.

What is claimed is:

1. A circuit for generating an output voltage using an input voltage, the circuit comprising:
    a first power converter circuit controlled according to a first Pulse Width Modulation (PWM) signal to produce the output voltage using the input voltage;
    a feedback circuit to produce a feedback signal according to a voltage value of the output voltage;
    an error amplifier to produce an error signal according to a difference of a reference voltage and the feedback signal;
    a first threshold generator circuit to produce a first threshold signal according to a sum of the error signal and a threshold voltage value, the threshold voltage value being determined using one of a value of the output voltage and a value of a switched node signal;
    a first PWM circuit comprising:
        a first comparator to compare a first Current Sense and Ramp (CSR) signal and the first threshold signal; and
    a first CSR circuit comprising:
        a first programmable current source to generate a first ramp current according to the first PWM signal and one of the input voltage and the switched node signal; and
        a first current sense circuit to generate a first current sense signal having a value corresponding to a current of the first power converter circuit,
        wherein the first CSR signal is generated using the first ramp current and the first current sense signal.

2. The circuit of claim 1, the PWM circuit further comprising:
    a second comparator to compare the CSR signal and the error signal; and
    a Set-Reset Flip-Flop (SRFF) having a set input coupled to an output of the second comparator and a reset input coupled to the output of the first comparator,
    wherein the PWM signal is generated according to an output of SRFF.

3. The circuit of claim 1, the first threshold generator circuit comprising:
    an adaptive current source circuit generating an adaptive current according to the output voltage; and
    a resistor having a first terminal receiving the adaptive current and a second terminal coupled to the error signal,
    wherein the first threshold signal corresponds to sum of a voltage drop across the resistor and a value of the error signal.

4. The circuit of claim 1, the first threshold generator circuit comprising:
    a filter circuit to generate an output approximation signal using the switched node signal;
    an adaptive current source circuit to generate an adaptive current according to the output approximation signal; and
    a resistor having a first terminal receiving the adaptive current and a second terminal coupled to the error voltage,
    wherein the first threshold signal corresponds to sum of a voltage drop across the resistor and a value of the error signal.

5. The circuit of claim 1, the first threshold generator circuit comprising:
    an adaptive current source circuit to generate an adaptive current according to the output voltage;
    a resistor having a first terminal receiving the adaptive current and a second terminal coupled to the error voltage; and
    a switch coupled between the threshold signal and the error signal and controlled using the PWM signal,
    wherein the threshold signal corresponds to a voltage value of the first terminal of the resistor.

6. The circuit of claim 1, further comprising:
    a second power converter circuit controlled according to a second Pulse Width Modulation (PWM) signal to produce the output voltage using the input voltage;
    a phase sequencing circuit to assert one of a plurality of phase select signals according to assertions of the first and second PWM signals;
    the first PWM circuit further comprising wherein the first PWM signal is generated according a first phase select signal of the plurality of phase select signals;
    a second PWM circuit comprising:
        a second comparator to compare a second CSR signal and a second threshold signal, wherein the second PWM signal is generated according to the output of the second comparator and a second phase select signal of the plurality of phase select signals; and
    a second CSR circuit comprising:
        a second programmable current source to generate a second ramp current according to the second PWM signal and one of the input voltage and the switched node signal; and
        a second current sense circuit to generate a second current sense signal according to a current of the second power converter circuit,
        wherein the second CSR signal is generated using the second ramp current and the second current sense signal.

7. The circuit of claim 6, further comprising:
    a first module, the first module comprising:
        a first phase enable latch,
        the feedback circuit,
        the error amplifier,
        the first threshold generator circuit,
        the first PWM circuit, and
        the first CSR circuit; and
    a second module, the second module comprising:
        a second phase enable latch,
        a second threshold generator circuit to produce the second threshold signal according to the error signal and the output voltage,
        the second PWM circuit, wherein the second comparator operates to compare the second CSR signal and the second threshold signal, and
        the second CSR circuit;
    wherein the phase sequencing circuit comprises a daisy-chain circuit, the daisy-chain circuit comprising:
        the first phase enable latch of the first module, and
        the second phase enable latch of in the second module.

8. The circuit of claim 1, wherein the first CSR circuit comprises:

a first switch to couple the first ramp current to the first CSR signal in response to the PWM signal being asserted; and a second switch to couple the first current sense signal to the first CSR signal when the PWM signal is de-asserted.

9. A circuit for generating an output voltage from an input voltage, the circuit comprising:

a Pulse Width Modulation (PWM) controller to:
initiate a PWM pulse on a PWM signal according to a first comparison, the first comparison using a Current Sense and Ramp (CSR) signal and an error signal;
end the PWM pulse on the PWM signal according to a second comparison, the second comparison using the CSR signal and a threshold signal; and
a threshold signal generation circuit to generate the threshold signal by summing a threshold voltage value and the error signal, the value of the threshold voltage value corresponding to a value of the output voltage,
wherein the CSR signal is generated using a current sense signal and a ramp signal,
wherein a value of the current sense signal corresponds to a current of a power converter circuit controlled using the PWM signal, and
wherein the error signal is generated, using an error amplifier, according to the output voltage and a reference voltage.

10. The circuit of claim 9, wherein the threshold signal generation circuit comprises:

an adaptive current source circuit to generate a current according to the output voltage; and
a resistor having a first terminal coupled to the adaptive current source circuit,
wherein the threshold voltage value corresponds to a voltage drop across the resistor.

11. The circuit of claim 10, further comprising:

a comparator to generate the PWM pulse, the comparator having a negative input coupled to the CSR signal and a positive input couple to the first terminal of the resistor; and
a switch coupled between the first terminal of the resistor and the error signal,
wherein the comparator performs the first comparison when the switch is turned on, and
wherein the comparator performs the second comparison when the switch is turned off.

12. The circuit of claim 9, further comprising:

a first comparator to perform the first comparison and having a positive input coupled to the error signal; and
a second comparator to perform the second comparison and having a positive input couple to the CSR signal and a negative input coupled to the threshold signal.

13. The circuit of claim 12, further comprising:

a summing circuit to generate an output having a value equal to a sum of a value of the CSR signal and a value of a common ramp signal,
wherein a negative input of the first comparator is coupled to the output of the summing circuit.

14. The circuit of claim 9, wherein the circuit is a module of a plurality of substantially identical modules, wherein the plurality of substantially identical modules includes a module configured to operate as a master module,
wherein the module configured to operate as the master module generates an error signal used by each module of the plurality of substantially identical modules, and
wherein a clock input of each module of the plurality of substantially identical modules is respectively connected to a clock output of another module of the plurality of substantially identical modules to sequentially activate each of the plurality of substantially identical modules.

15. The circuit of claim 9, further comprising a CSR generator circuit, the CSR generator circuit to:

generate the ramp signal having a value that changes at a rate according to the input voltage or at a rate according to a switched node signal from a driven terminal of an inductor;
when the PWM pulse is not on the PWM signal, generate the CSR signal according to the current sense signal; and
when the PWM pulse is on the PWM signal, generate the CSR signal according to the ramp signal and the value of the current sense signal at time corresponding to the initiation of the PWM pulse.

16. A method for controlling, using one or more pulsed signals, a power converter to generate an output voltage from an input voltage, the method comprising:

generating an error signal according to the output voltage and a reference voltage;
generating a Current Sense and Ramp (CSR) signal using a current sense signal and a ramp signal;
generating a threshold voltage value corresponding to the output voltage;
generating a threshold signal by summing the threshold voltage value and a value of the error signal;
performing a first comparison of the CSR signal and the error signal;
initiating a pulse on a first pulsed signal of the one or more pulsed signals in response to a result of the first comparison;
performing a second comparison of the CSR signal and the threshold signal; and
ending the pulse on the first pulsed signal in response to a result of the second comparison,
wherein a value of the current sense signal corresponds to a current of the power converter.

17. The method of claim 16, further comprising:

generating the CSR signal having a reset value corresponding to the value of the current sense signal and a post-reset rate of increase according to the input voltage.

18. The method of claim 16, further comprising:

sequentially asserting exactly one of a plurality of phase select signals according to pulses on the one or more pulsed signals; and
initiating a pulse on a first pulsed signal of the one or more pulsed signals in response to a result of the first comparison when a first phase select signal of the plurality of phase select signals is asserted.

* * * * *